US011595635B2

United States Patent
Bai et al.

(10) Patent No.: US 11,595,635 B2
(45) Date of Patent: *Feb. 28, 2023

(54) COMMUNICATION METHODS AND SYSTEMS, ELECTRONIC DEVICES, SERVERS, AND READABLE STORAGE MEDIA

(71) Applicant: GUANGDONG OPPO MOBILE TELECOMMUNICATIONS CORP., LTD., Guangdong (CN)

(72) Inventors: Jian Bai, Guangdong (CN); Hai Tang, Guangdong (CN); Xueyong Zhang, Guangdong (CN); Xiangnan Lyu, Guangdong (CN); Yang Xia, Guangdong (CN); Hu Li, Guangdong (CN); Ting Chen, Guangdong (CN); Guohui Tan, Guangdong (CN); Zhengpeng Tan, Guangdong (CN); Biao Chen, Guangdong (CN); Fenghua Xu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 284 days.

This patent is subject to a terminal disclaimer.

(21) Appl. No.: 16/994,648

(22) Filed: Aug. 16, 2020

(65) Prior Publication Data

US 2020/0382763 A1 Dec. 3, 2020

Related U.S. Application Data

(63) Continuation of application No. 16/403,569, filed on May 5, 2019, now Pat. No. 10,785,468.

(30) Foreign Application Priority Data

May 6, 2018 (CN) .......................... 201810423518.4

(51) Int. Cl.
*H04N 13/271* (2018.01)
*G06T 7/521* (2017.01)
(Continued)

(52) U.S. Cl.
CPC ........... *H04N 13/271* (2018.05); *G06T 7/521* (2017.01); *H04N 7/15* (2013.01); *H04N 13/161* (2018.05);
(Continued)

(58) Field of Classification Search
CPC ...... H04N 13/271; H04N 7/15; H04N 13/161; H04N 13/254; H04N 13/332;
(Continued)

(56) References Cited

U.S. PATENT DOCUMENTS 10,728,526 B2 * 7/2020 Bai ..................... H04W 56/001
10,785,468 B2 * 9/2020 Bai ......................... G06T 7/521
(Continued)

FOREIGN PATENT DOCUMENTS

CN 102164265 8/2011
CN 102333230 1/2012
(Continued)

OTHER PUBLICATIONS

SIPO, First Office Action for CN Application No. 201810423518.4, dated May 15, 2019.
(Continued)

Primary Examiner — Stella L. Woo
(74) Attorney, Agent, or Firm — Hodgson Russ LLP

(57) ABSTRACT

The present disclosure provides a communication method, and an electronic device. The method includes: obtaining, by an electronic device, a plurality of 2D images and/or a plurality of depth maps for a current scene, the plurality of 2D images and/or the plurality of depth maps being aligned in time; and transmitting, by the electronic device, the
(Continued)

plurality of 2D images and/or the plurality of depth maps to the server by means of wireless communication.

20 Claims, 12 Drawing Sheets

(51) Int. Cl.
| | |
|---|---|
| *H04N 13/332* | (2018.01) |
| *H04N 13/254* | (2018.01) |
| *H04N 13/161* | (2018.01) |
| *H04N 7/15* | (2006.01) |
| *H04W 4/06* | (2009.01) |
| *H04N 13/00* | (2018.01) |
| *H04L 67/01* | (2022.01) |

(52) U.S. Cl.
CPC ......... *H04N 13/254* (2018.05); *H04N 13/332* (2018.05); *H04W 4/06* (2013.01); *H04L 67/01* (2022.05); *H04N 2013/0081* (2013.01)

(58) Field of Classification Search
CPC ........... H04N 2013/0081; H04N 7/147; H04N 19/597; H04N 19/60; H04N 13/194; H04N 7/141; H04N 13/261; G06T 7/521; H04W 4/06; H04L 67/01
See application file for complete search history.

(56) References Cited

U.S. PATENT DOCUMENTS

| | | | | |
|---|---|---|---|---|
| 2010/0118117 | A1* | 5/2010 | Kroll | G03H 1/2249 348/E13.001 |
| 2012/0113210 | A1* | 5/2012 | Kim | H04N 13/183 348/E7.083 |
| 2013/0016176 | A1 | 1/2013 | Hines et al. | |
| 2014/0028799 | A1 | 1/2014 | Kuffner et al. | |
| 2015/0365628 | A1 | 12/2015 | Ben-Bassat | |
| 2016/0092608 | A1 | 3/2016 | Yamamoto et al. | |
| 2016/0113483 | A1 | 4/2016 | Uzbelger Feldman | |
| 2016/0286194 | A1 | 9/2016 | Nadler | |
| 2017/0076700 | A1* | 3/2017 | Yoo | G09G 5/39 |
| 2017/0248916 | A1 | 8/2017 | Lee et al. | |
| 2017/0295357 | A1* | 10/2017 | Yang | H04N 21/816 |
| 2017/0347121 | A1 | 11/2017 | Park et al. | |
| 2018/0091819 | A1 | 3/2018 | Cook et al. | |
| 2018/0130255 | A1 | 5/2018 | Hazeghi et al. | |
| 2019/0310741 | A1* | 10/2019 | Ganadas | H04N 21/44218 |

FOREIGN PATENT DOCUMENTS

| | | |
|---|---|---|
| CN | 102413306 | 4/2012 |
| CN | 102164265 | 3/2013 |
| CN | 106296578 | 1/2017 |
| CN | 106507122 | 3/2017 |
| CN | 107257426 | 10/2017 |
| CN | 107393000 | 11/2017 |
| CN | 108769646 | 11/2018 |
| WO | 2017190351 | 11/2017 |
| WO | 2018070121 | 4/2018 |

OTHER PUBLICATIONS

WIPO, English translation of the ISR and WO for PCT/CN2019/085139, dated Jul. 26, 2019.
EPO, Office Action for EP Application No. 19172216.4, dated Oct. 8, 2019.
USPTO, Office Action for U.S. Appl. No. 16/403,569, filed Nov. 6, 2019.
USPTO, Office Action for U.S. Appl. No. 16/403,569, filed Mar. 11, 2020.
SIPO, First Office Action for CN Application No. 202010036556.1, dated Mar. 26, 2021.
IPIN, Office Action for IN Application No. 201914017387, dated Jan. 27, 2021.
EPO, Communication for EP Application No. 19172216.4, dated Oct. 13, 2021.

* cited by examiner

COMMUNICATION METHODS AND SYSTEMS, ELECTRONIC DEVICES, SERVERS, AND READABLE STORAGE MEDIA

CROSS REFERENCE TO RELATED APPLICATION

This application is a continuation of U.S. application Ser. No. 16/403,569, filed May 5, 2019, which claims priority to Chinese Patent Application No. 201810423518.4, filed May 6, 2018, the entire disclosures of which are incorporated herein by reference.

TECHNICAL FIELD

The present disclosure relates to the field of communications technologies, and more particularly, to a communication method, a communication system, an electronic device, a server, and a non-transitory computer-readable storage medium.

BACKGROUND

At present, 2D (2-dimensional or two-dimensional) video is widely used in people's lives and work, for example, 2D video playing, 2D video calling, 2D video conferencing. However, although 2D video may give people enough imagery, it does not contain depth information and cannot achieve stereoscopic rendering because images that make up 2D video are 2D.

SUMMARY

The communication method provided in a first aspect of the embodiments of the present disclosure, includes:

obtaining, by an electronic device, a plurality of 2D images and/or a plurality of depth maps for a current scene, the plurality of 2D images and/or the plurality of depth maps being aligned in time; and transmitting, by the electronic device, the plurality of 2D images and/or the plurality of depth maps to the server by means of wireless communication.

The communication method provided in a second aspect of the embodiments of the present disclosure, includes:

receiving, from an electronic device, a plurality of 2D images and/or a plurality of depth maps, the plurality of 2D images and/or the plurality of depth maps being aligned in time;

generating a plurality of 3D images based on the plurality of 2D images and/or the plurality of depth maps; and transmitting the plurality of 3D images to a terminal device.

The electronic device provided in a third aspect of the embodiments of the present disclosure includes: an image acquisition component, configured to obtain a plurality of two-dimensional (2D) images and/or a plurality of depth maps for a current scene, the plurality of 2D images and/or the plurality of depth maps being aligned in time; and a communication module, configured to transmit the plurality of 2D images and/or the plurality of depth maps to the server by means of wireless communication.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
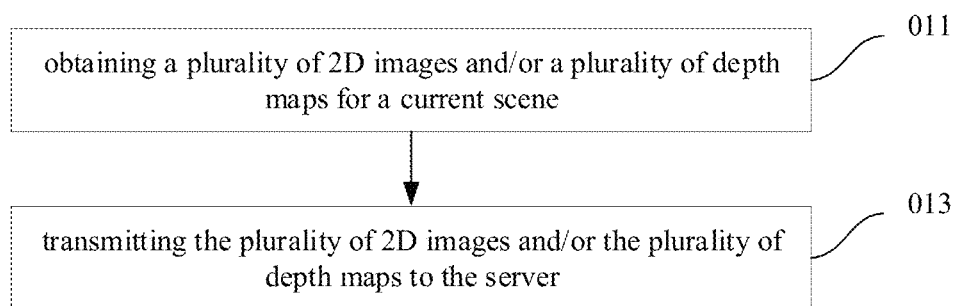
FIG. 1 illustrates a flow chart of a communication method according to some embodiments of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Referring to FIG. 1, FIG. 2, FIG. 11 and FIG. 12, the present disclosure provides a communication method for an electronic device 10. The electronic device 10 communicates with a server 30 by means of wireless communication. The method includes acts in the following blocks.

011: a plurality of 2D images and/or a plurality of depth maps, for a current scene, are obtained. The plurality of 2D images and/or the plurality of depth maps are aligned in time.

013: the plurality of 2D images and/or the plurality of depth maps are transmitted to the server 30. The server 30 is configured to generate a plurality of 3D images based on the plurality of 2D images and/or the plurality of depth maps, and to transmit the plurality of 3D images to a terminal device 20.

Figure 2:
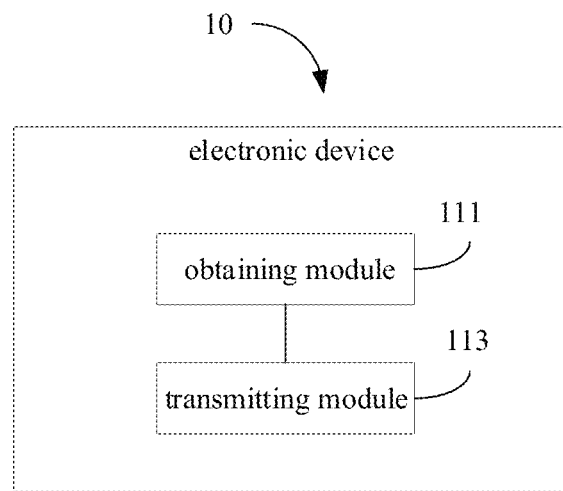
FIG. 2 illustrates a block diagram of an electronic device according to some embodiments of the present disclosure.

Referring to FIG. 2, the present disclosure further provides an electronic device 10. The electronic device 10 communicates with the server 30 by means of wireless communication. The electronic device 10 includes an obtaining module 111 and a transmitting module 113. The act in block 011 may be implemented by the obtaining module 111. The act in block 013 may be implemented by the transmitting module 113. That is, the obtaining module 111 may be configured to obtain the plurality of 2D images and/or the plurality of depth maps for a current scene. The transmitting module 113 may be configured to transmit the plurality of 2D images and/or the plurality of depth maps to the server 30. The server 30 is configured to generate the plurality of 3D images based on the plurality of 2D images and/or the plurality of depth maps, and to transmit the plurality of 3D images to a terminal device 20. In detail, the server 30 may generate the plurality of 3D images by the existing 3D technologies, such as data representing as (RGB (i.e., 2D image), depth (i.e., the depth image), T (i.e., time)) may be displayed by software such as meshlab, or holographic projection technologies, which is omitted herein.

Figure 3:
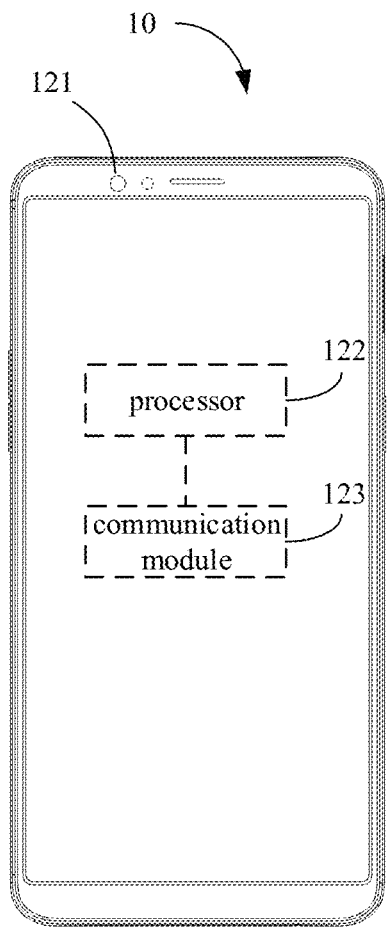
FIG. 3 illustrates a schematic diagram of an electronic device according to some embodiments of the present disclosure.
Figure 4:
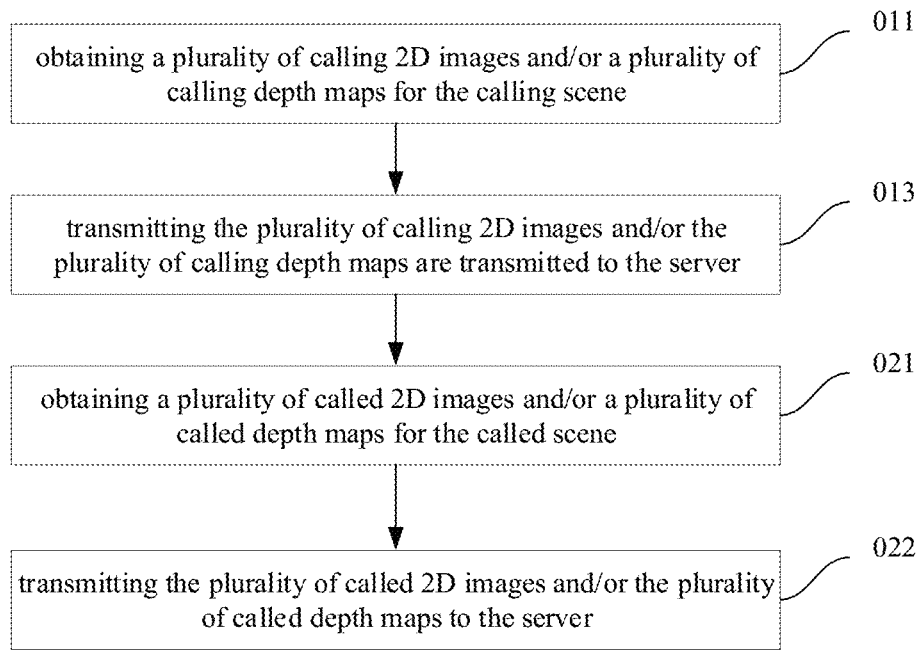
FIG. 4 illustrates a flow chart of a communication method according to some embodiments of the present disclosure.

Referring to FIG. 3, the present disclosure further provides an electronic device 10. The electronic device 10 communicates with the server 30 by means of wireless communication. The electronic device 10 includes an image acquisition component 121 and a communication module 123. The act in block 011 may be implemented by the image acquisition component 121. The act in block 013 may be implemented by the communication module 123. That is, the image acquisition component 121 may be configured to obtain the plurality of 2D images and/or the plurality of depth maps for a current scene. The communication module 123 may be configured to transmit the plurality of 2D images and/or the plurality of depth maps to the server 30. The server 30 is configured to generate the plurality of 3D images based on the plurality of 2D images and/or the plurality of depth maps, and to transmit the plurality of 3D images to a terminal device 20.

The electronic device 10 may be a mobile phone, a tablet computer, a notebook computer, a smart wearable device (a smart helmet, smart glasses, a smart bracelet, a smart watch, etc.), and the like. The terminal device 20 may also be a mobile phone, a tablet computer, a notebook computer, a smart wearable device (a smart helmet, smart glasses, a smart bracelet, a smart watch, etc.), and the like, and also be the other display device, such as a virtual-reality head-mounted display device, an augmented-reality display device, a holographic stereoscopic projection device, a television equipped with a 3D liquid crystal displayer. The server 30 may be a computer or the like having a strong capability of computing and processing and a large storage capacity.

The image acquisition component 121 may be front or rear.

In detail, the image acquisition component 121 may include a structured light projection module. The structured light projection module may include a structured light projector and an infrared camera. The structured light projector emits a laser pattern into a target space. The infrared camera captures a laser pattern modulated by the target object. The electronic device 10 further includes a processor 122. The processor 122 calculates a depth map of the laser pattern by using an image matching algorithm. When the image acquisition component 121 includes the structured light projection module, the image acquisition component 121 also includes a visible light camera for acquiring a 2D image of the target space. The 2D image includes color information of each object in the target space. In this manner, after the image acquisition component 121 collects the plurality of 2D images and the plurality of depth maps having the one-to-one corresponding, the communication module 123 transmits the plurality of 2D images and the plurality of depth maps to the server 30 by means of wireless communication. The server 30 also includes a processor 322 (illustrated in FIG. 15). The processor 322 obtains a plurality of 3D images based on the plurality of 2D images and the plurality of depth maps. The server 30 transmits the plurality of 3D images to the terminal device 20 by means of wireless communication. The terminal device 20 performs display. The plurality of 3D images may form a 3D video. In detail, the plurality of 3D images is displayed at a predetermined frame rate in the terminal device 20 to form a 3D video. The predetermined frame rate is greater than or equal to a frame rate that can be resolved by the human eye (i.e. 24 3D images per second may be displayed). The predetermined frame rate may be 24 frames (images)/second, 30 frames (images)/second, 60 frames (images)/second, 120 frames (images)/second, and the like.

Alternatively, the image acquisition component 121 may include two cameras. The two cameras may both be visible light cameras, or the two cameras may be an infrared camera and a visible light camera. The two cameras have a fixed relative distance. Thus, a plurality of first 2D images and a plurality of second 2D images may be obtained by the binocular stereoscopic acquisition method. When the two cameras may both be the visible light cameras, the first 2D image and the second 2D image are 2D color images. When the two cameras are the infrared camera and the visible light camera, the first 2D image is a 2D infrared image, and the second 2D image is a 2D color image. In this manner, after the image acquisition component 121 collects the plurality of first 2D images and the plurality of second 2D images having the one-to-one corresponding, the communication module 123 transmits the plurality of first 2D images and the plurality of second 2D images to the server 30 by means of wireless communication. The processor 322 obtains the plurality of 3D images based on the plurality of received first 2D images and the plurality of received second 2D images having the one-to-one corresponding. The server 30 transmits the plurality of 3D images to the terminal device 20 by means of wireless communication. The terminal device 20 performs display. The plurality of 3D images may form a 3D video. In detail, the plurality of 3D images is displayed at a predetermined frame rate in the terminal device 20 to form a 3D video. The predetermined frame rate is greater than or equal to a frame rate that can be resolved by the human eye (i.e. 24 3D images per second may be displayed). The predetermined frame rate may be 24 frames (images)/second, 30 frames (images)/second, 60 frames (images)/second, 120 frames (images)/second, and the like.

Alternatively, the image acquisition component 121 may include a TOF sensor module. The TOF sensor module includes a laser projector and an infrared camera. The laser projector emits uniform light into a target space. The infrared camera receives the reflected light and records the time point of emitting the light and the time point of receiving the light. The processor 122, based on a time difference between the time point of emitting the light and the time point of receiving the light, and the speed of light, calculates a depth pixel value corresponding to the object in the target space and combines the plurality of depth pixel values to obtain a depth map. When the image acquisition component 121 includes the TOF sensor module, the image acquisition component 121 also includes a visible light camera for capturing a 2D image of the target space. The 2D image includes color information of each object in the target space. In this manner, after the image acquisition component 121 collects the plurality of 2D images and the plurality of depth maps having the one-to-one corresponding, the communication module 123 transmits the plurality of 2D images and the plurality of depth maps to the server 30 by means of wireless communication. The server 30 also includes a processor 322 (illustrated in FIG. 15). The processor 322 obtains a plurality of 3D images based on the plurality of 2D images and the plurality of depth maps. The server 30 transmits the plurality of 3D images to the terminal device 20 by means of wireless communication. The terminal device 20 performs display. The plurality of 3D images may form a 3D video. In detail, the plurality of 3D images is displayed at a predetermined frame rate in the terminal device 20 to form a 3D video. The predetermined frame rate is greater than or equal to a frame rate that can be resolved by the human eye (i.e. 24 3D images per second may be displayed). The predetermined frame rate may be 24 frames (images)/second, 30 frames (images)/second, 60 frames (images)/second, 120 frames (images)/second, and the like.

It may be understood that current video calls, video conferences, and the like are limited to the 2D video transmission. The plurality of images that make up the 2D video are 2D, which do not contain depth information, and cannot render 3D stereoscopic effects.

The communication method and the electronic device 10, provided in the embodiments of the present disclosure, collect the plurality of 2D images and the plurality of depth maps, and transmit the plurality of 2D images and the plurality of depth maps to the server 30, such that the server 30 may convert the plurality of 2D images and the plurality of depth maps to the plurality of 3D images. The plurality of 3D images is transmitted by the server 30 to the terminal device 20 by means of wired communication and/or by means of wireless communication. In this way, on one hand, the 3D video transmission may be realized, such that a user may view stereoscopic 3D video effect at the terminal device 20, and have a better experience; on the other hand, converting the plurality of 2D images and/or the plurality of depth maps to the plurality of 3D images may be realized at the server 30. Since the server 30 has a powerful capability of computing and processing, it may shorten a period of converting the plurality of 2D images and/or the plurality of depth maps to the plurality of 3D images, without calculation at the electronic device 10, thereby reducing an amount of data processing, and power consumption of the electronic device 10, and reducing a time period required for image processing, and shortening the delay in video communication.

Referring to FIG. 4, FIG. 5, FIG. 11 and FIG. 12, in some embodiments, the communication method provided in the embodiments of the present disclosure may be applied to a 3D video call and a 3D video conference, which may realize the interaction among the users. It is assumed that the electronic device 10 is a calling device, and the terminal device 20 is a called device. In this case, the act in block 011 may be follows: a plurality of calling 2D images and/or a plurality of calling depth maps are obtained for the calling scene; the act in block 013 may be follows: the plurality of calling 2D images and/or the plurality of calling depth maps are transmitted to the server 30. The plurality of calling 2D images and/or the plurality of calling depth maps are aligned in time. Further, the method provided in the embodiments of the present disclosure further includes acts in the following blocks.

021: a plurality of called 2D images and/or a plurality of called depth maps, for the called scene, are obtained. The plurality of called 2D images and/or the plurality of called depth maps are aligned in time.

022: the plurality of called 2D images and/or the plurality of called depth maps are transmitted to the server 30.

Figure 5:
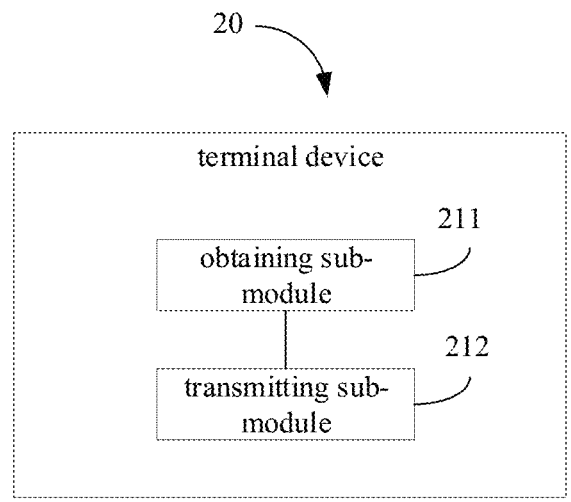
FIG. 5 illustrates a block diagram of a terminal device according to some embodiments of the present disclosure.

Referring to FIG. 5, in some embodiments, the terminal device 20 includes an obtaining sub-module 211 and a transmitting sub-module 212. The act in block 021 may be implemented by the obtaining sub-module 211. The act in block 022 may be implemented by the transmitting sub-module 212. That is, the obtaining sub-module 211 is configured to obtain the plurality of called 2D images and/or the plurality of called depth maps, for the called scene. The transmitting sub-module 212 is configured to transmit the plurality of called 2D images and/or the plurality of called depth maps to the server 30.

Figure 6:
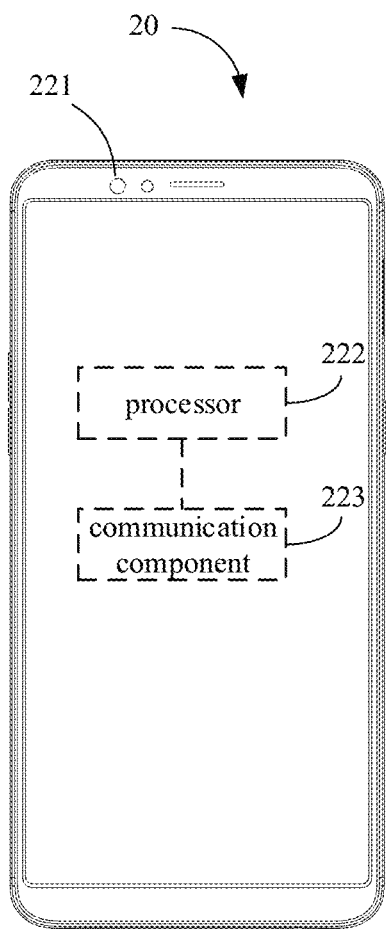
FIG. 6 illustrates a schematic diagram of a terminal device according to some embodiments of the present disclosure.
Figure 7:
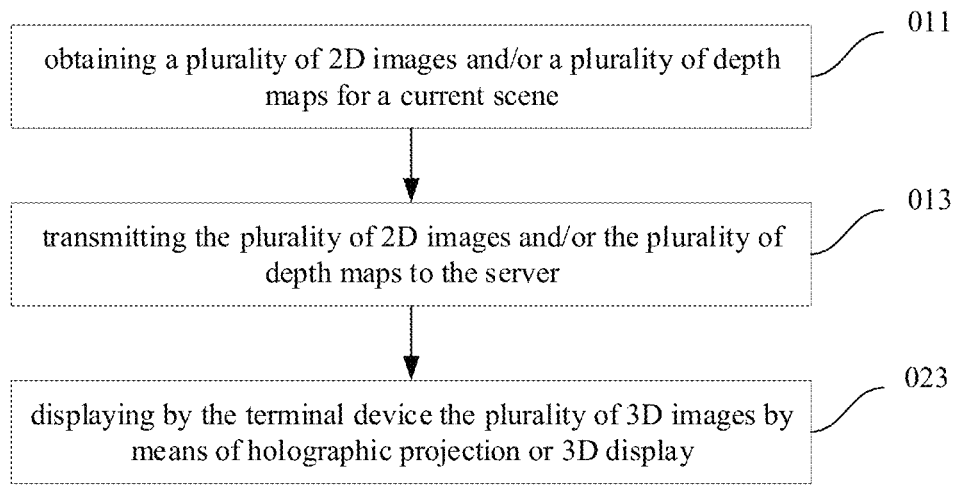
FIG. 7 illustrates a flow chart of a communication method according to some embodiments of the present disclosure.

Referring to FIG. 6, in some embodiments, the terminal device 20 includes an image acquisition component 221 and a communication component 223. The act in block 021 may be implemented by the image acquisition component 221. The act in block 022 may be implemented by the communication component 223. That is, the image acquisition component 221 is configured to obtain the plurality of called 2D images and/or the plurality of called depth maps, for the called scene. The communication component 223 is configured to transmit the plurality of called 2D images and/or the plurality of called depth maps to the server 30.

The image acquisition component 221 may include a structured light projection module, dual cameras, or a TOF sensor module. The image acquisition component 221 may be front or rear.

In detail, the electronic device 10 is referred to as the reference device, such that the electronic device 10 is the calling device, and the use object of the electronic device 10 is the calling object; the terminal device 20 is the called device, and the use object of the terminal device 20 is the called object. The image acquisition component 121 of the electronic device 10 is responsible for collecting the plurality of calling 2D images and/or the plurality of calling depth maps of the target space in which the calling object is located, and the plurality of calling 2D images and/or the plurality of calling depth maps are transmitted to the server 30 by the communication module 123. The processor 321 of the server 30 converts the plurality of calling 2D images and/or the plurality of calling depth maps to a plurality of calling 3D images, and the communication unit 322 of the server 30 transmits the plurality of calling 3D images to the terminal device 20 by means of wired communication and/or by means of wireless communication. After receiving by the terminal device 20, the terminal device 20 plays the plurality of calling 3D images at a predetermined frame rate, such that the called object views the 3D video of the calling object. Similarly, at the end of the called device, the image acquisition component 221 of the terminal device 20 is responsible for collecting the plurality of called 2D images and/or the plurality of called depth maps of the target space in which the called object is located, and the communication component 223 transmits the plurality of called 2D images and/or the plurality of called depth maps to the server 30. The processor 321 of the server 30 converts the plurality of called 2D images and/or the plurality of called depth maps to obtain the plurality of called 3D images, and the communication unit 322 of the server 30 transmits the plurality of called 3D images to the electronic device 10 by means of wireless communication. After receiving by the electronic device 10, the electronic device 10 may display the plurality of called 3D images at a predetermined frame rate, such that the calling object may view the 3D video of the called object.

In this way, both the electronic device 10 and the terminal device 20 may transmit the plurality of 2D images and/or the plurality of depth maps, realizing the interaction of the 3D video between the electronic device 10 and the terminal device 20, and the 3D video call, the 3D video conference, and the like. In addition, the calculation of the 3D image is performed by the server 30, thereby reducing the data processing pressure on the electronic device 10 and the terminal device 20, speeding up the image processing, and reducing the delay of the 3D video call or the 3D video conference. Therefore, the process of 3D video calling or 3D video conferencing is smoother and timelier, and the user experience is better.

Referring to FIG. 7, FIG. 8, FIG. 11 and FIG. 12, in some embodiments, the communication method provided in the embodiments of the present disclosure may also be applied to a virtual-reality head-mounted display device, an augmented-reality display device, a holographic stereoscopic projection device, a display device equipped with a 3D liquid crystal displayer, or the like. At this time, the method provided in the embodiments of the present disclosure further includes acts in the following blocks.

023: the terminal device 20 displays the plurality of 3D images by means of holographic projection or 3D display.

Figure 8:
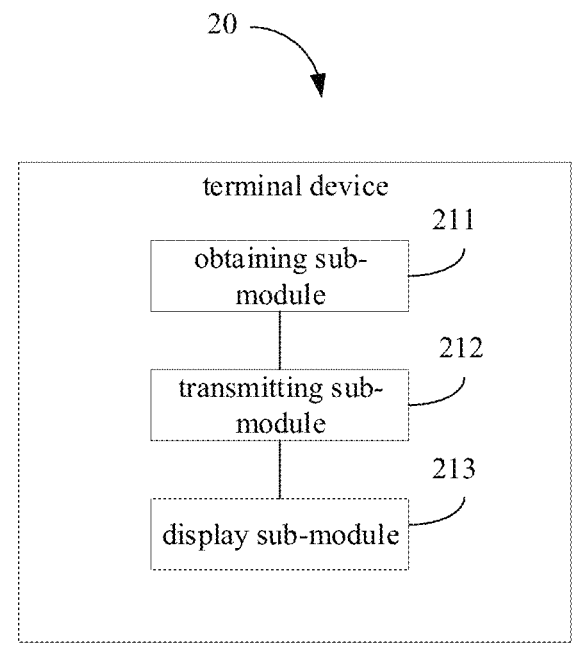
FIG. 8 illustrates a block diagram of a terminal device according to some embodiments of the present disclosure.
Figure 9:
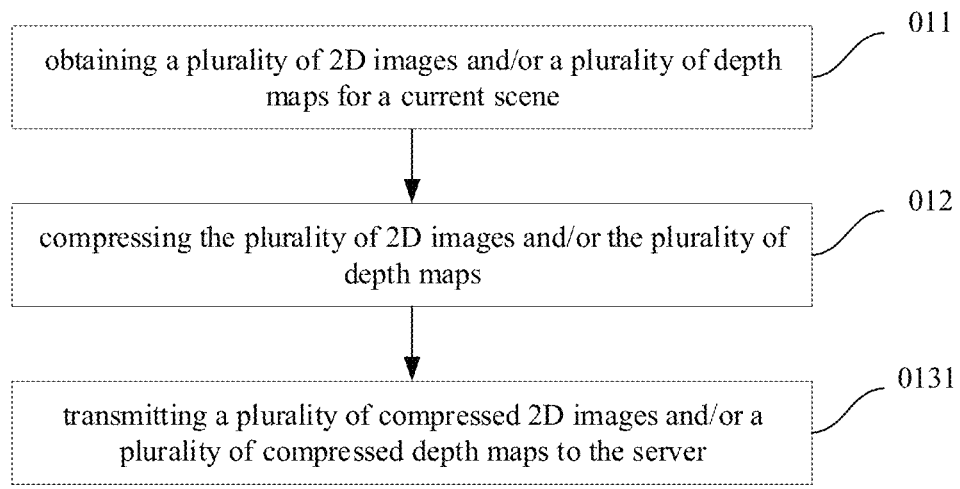
FIG. 9 illustrates a flow chart of a communication method according to some embodiments of the present disclosure.

Referring to FIG. 8, in some embodiments, the terminal device 20 includes a display sub-module 213. The act in block 023 may be implemented by the display sub-module 213. That is, the display sub-module 213 may be a light machine (an optical engine) using holographic projection or a display screen displaying the plurality of 3D images by means of 3D display.

Referring to FIG. 6, in some embodiments, the terminal device 20 further includes a processor 222. The act in block 023 may be implemented by the processor 222 of the terminal device 20. That is, the processor 222 may be configured to control the terminal device 20 to display the plurality of 3D images by means of holographic projection or 3D display.

In detail, the image acquisition component 121 of the electronic device 10 is responsible for collecting the plurality of 2D images and/or the plurality of depth maps for the target space in which the use object of the electronic device 10 is located. The communication module 123 of the electronic device 10 transmits the plurality of 2D images and/or the plurality of depth maps to the server 30 by means of wireless communication. The processor 322 of the server 30 converts the plurality of 2D images and/or the plurality of depth maps to the plurality of 3D images, and the communication unit 322 of the server 30 transmits the plurality of 3D images to the terminal device 20 by means of wired communication and/or by means of wireless communication. The terminal device 20 displays the plurality of 3D images to present a 3D display effect.

As such, when the electronic device 10 is not equipped with the display device of the display function, the plurality of 2D images and/or the plurality of depth maps may be transmitted to the server 30 by means of wireless communication, and the plurality of 3D images is formed by the server 30, and then the plurality of 3D images is transmitted by the server 30 to the device that may display the 3D images, such that the user may view the stereoscopic rendering effect of the 3D video, which is beneficial to improve the user experience.

Referring to FIG. 9, FIG. 10, FIG. 11 and FIG. 12, in some embodiments, the communication method provided in the embodiments of the present disclosure further includes acts in the following blocks.

012: the plurality of 2D images and/or the plurality of depth maps are compressed. The compressing may refer to standards published by the JPEG (Joint Photographic Experts Group).

The act in block 013, i.e., the plurality of 2D images and/or the plurality of depth maps are transmitted to the server 30, may include an act in the following blocks.

0131: a plurality of compressed 2D images and/or a plurality of compressed depth maps are transmitted to the server 30.

Figure 10:
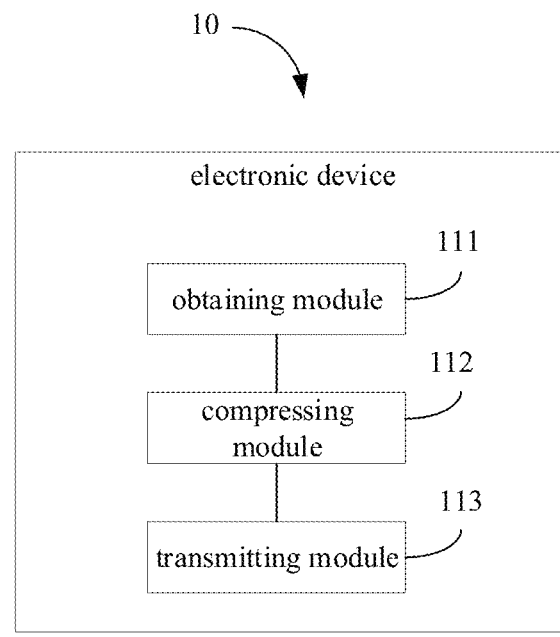
FIG. 10 illustrates a block diagram of an electronic device according to some embodiments of the present disclosure.

Referring to FIG. 10, in some embodiments, the electronic device 10 further includes a compressing module 112. The act in block 012 may be implemented by the compressing module 112. The act in block 0131 may be implemented by the transmitting module 113. That is, the compressing module 112 may be configured to compress the plurality of 2D images and/or the plurality of depth maps. The transmitting module 113 may be configured to transmit the plurality of compressed 2D images and/or the plurality of compressed depth maps to the server 30.

Referring to FIG. 3, in some embodiments, the act in block 012 may be implemented by the processor 122 of the electronic device 10. The act in block 0131 may be implemented by the communication module 123. That is, the processor 122 of the electronic device 10 may be configured to compress the plurality of 2D images and/or the plurality of depth maps. The communication module 123 may be configured to transmit the plurality of compressed 2D images and/or the plurality of compressed depth maps to the server 30.

It should be understood that a size of data packets including the plurality of 2D images and/or the plurality of depth maps is large, and it requires the wireless communication to have a higher transmission bandwidth when these data packets are transmitted (especially for an application scenario with higher requirements on low latency, such as a 3D video call). Due to the development of wireless communication technologies, current various wireless communication methods have not been able to achieve lossless transmission of data packets with the larger size. Therefore, it is necessary to compress the plurality of 2D images and/or the plurality of depth maps, and reduce the amount of the data packets including the plurality of 2D images and/or the plurality of depth maps, thereby realizing a higher-rate transmission on the data packet including the plurality of 2D images and/or the plurality of depth maps, and meeting the requirements of low latency in certain application scenarios.

Further, a compression ratio may be adaptively adjusted according to different application scenarios. In an actual application, the electronic device 10 determines the application scenario where the electronic device 10 locates firstly, and then adjusts the corresponding compression ratio according to the determined application scenario. For example, when the plurality of 2D images and/or the plurality of depth maps are transmitted for an application scenario of a video call, the accuracy of each 2D image and the corresponding depth map is not high. Therefore, the compression ratio may be appropriately increased correspondingly, such that the 3D video interaction may be realized on one hand, and the low delay requirement may also be satisfied on the other hand. When the plurality of 2D images and/or the plurality of depth maps are transmitted for holographic projection, the accuracy of each 2D image and the corresponding depth map is high, and accordingly, the compression ratio may be appropriately decreased, thereby meeting the high precision requirements of holographic projection scenes.

Similarly, for the terminal device 20, when the terminal device 20 transmits the plurality of called 2D images and/or the plurality of called depth maps, the plurality of called 2D images and/or the plurality of called depth maps also may be compressed. The plurality of compressed called 2D images and/or the plurality of compressed called depth maps may be transmitted to the server 30 by means of wired communication and/or by means of wireless communication. The compression ratio may also be adaptively adjusted according to different application scenarios.

Figure 11:
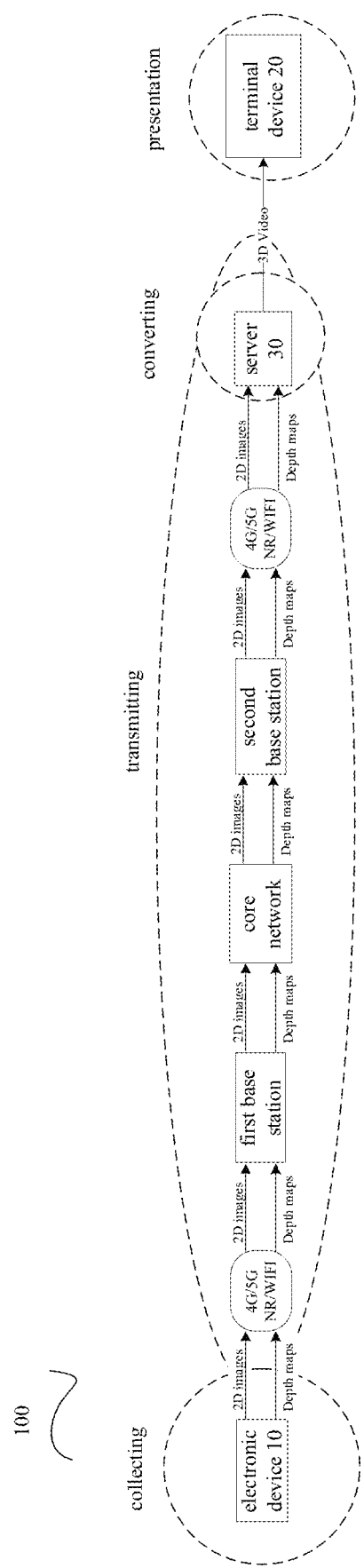
FIG. 11 and FIG. 12 illustrate schematic diagrams of a communication system according to some embodiments of the present disclosure.
Figure 12:
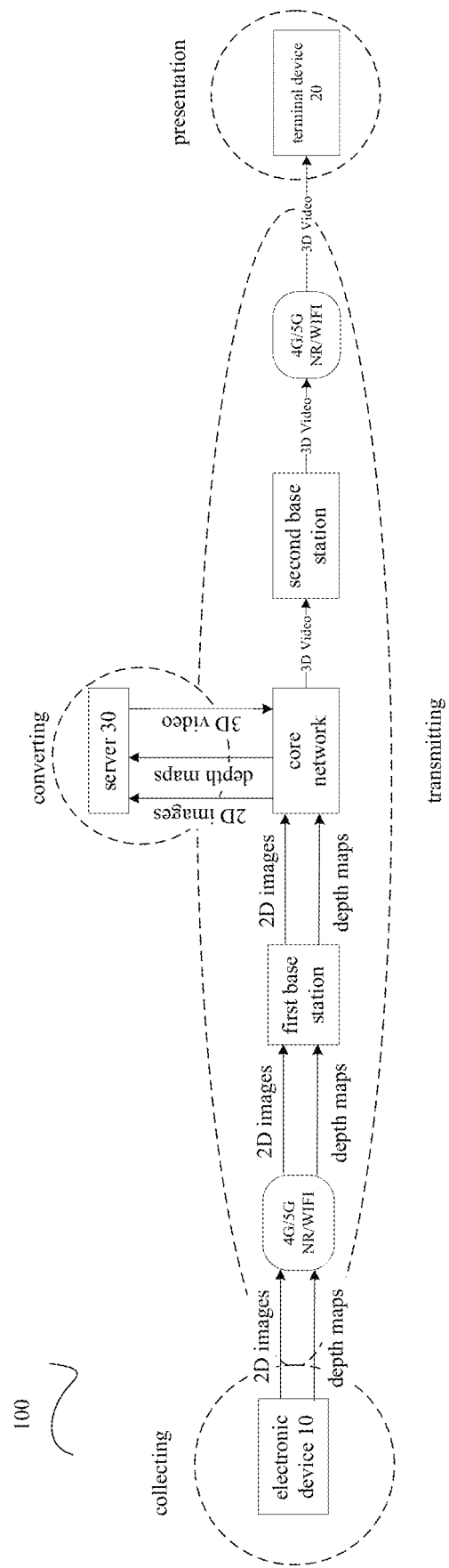
Figure 13:
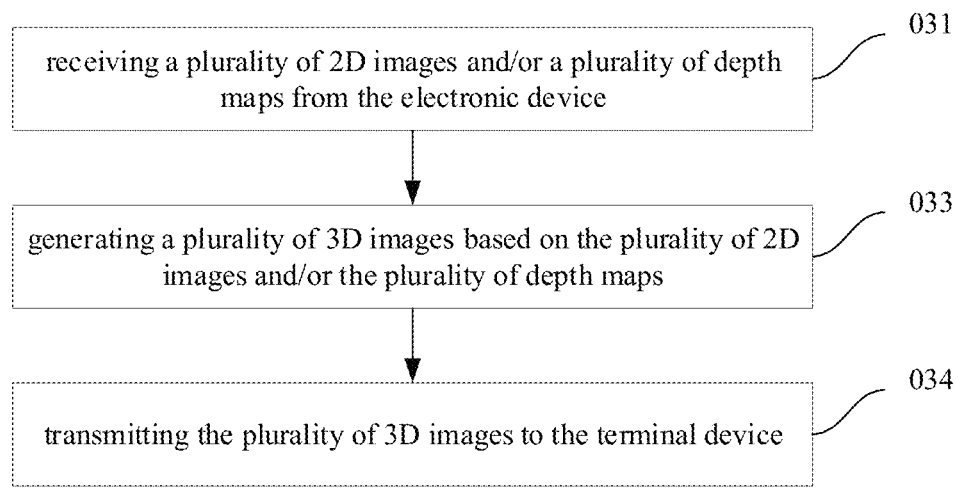
FIG. 13 illustrates a flow chart of a communication method according to some embodiments of the present disclosure.

Referring to FIG. 11 and FIG. 12, in some embodiments, the electronic device 10 transmits the plurality of 2D images and/or the plurality of depth maps to the server 30 by means of the sub-6G frequency band of 5G (the fifth-generation cellular mobile communication systems).

At this time, as illustrated in FIG. 11, a transmission route of the plurality of 2D images and/or the plurality of depth maps may be as follows. The electronic device 10 firstly transmits the plurality of 2D images and/or the plurality of depth maps to a first base station by means of the sub-6G frequency band of 5G The first base station transmits the plurality of 2D images and/or the plurality of depth maps to a core network by means of wired communication. The core network transmits the plurality of 2D images and/or the plurality of depth maps to a second base station by means of wired communication. The second base station transmits the plurality of 2D images and/or the plurality of depth maps to the server 30 by means of wireless communication. After the server 30 receives the plurality of 2D images and/or the plurality of depth maps, the server 3 converts them to the plurality of 3D images. The wireless communication between the second base station and the server 30 may be at least one of: WIFI (Wireless Fidelity), 4G (the fourth-generation cellular mobile communication systems) and 5G.

Alternatively, as illustrated in FIG. 12, a transmission route of the plurality of 2D images and/or the plurality of depth maps may be as follows. The electronic device 10 firstly transmits the plurality of 2D images and/or the plurality of depth maps to a first base station by means of the sub-6G frequency band of 5G The first base station transmits the plurality of 2D images and/or the plurality of depth maps to a core network by means of wired communication. The core network transmits the plurality of 2D images and/or the plurality of depth maps to the server 30 by means of wired communication. After the server 30 receives the plurality of 2D images and/or the plurality of depth maps, the server 3 convert them to the plurality of 3D images. At this time, the server 30 may be a server 30 independent of the core network, or may be a server 30 integrated in the core network. When the server 30 is integrated in the core network, the server 30 may be the rental server 30 provided by the operator.

The sub-6G frequency band of 5G includes a plurality of working frequency bands. For example, when the working frequency band is n78, the corresponding frequency range is 3.3 GHz to 3.8 GHz; when the working frequency band is n79, the corresponding frequency range is 4.4 GHz-5.0 GHz; when the working frequency band is n77, the corresponding frequency range is 3.3 GHz-4.2 GHz; when the working frequency band is n41, the corresponding frequency range is 2.496 GHz-2.690 GHz; when the working frequency band is n8, the corresponding uplink frequency range is 880 MHz-915 MHz, and the corresponding downlink frequency range is 915 MHz-960 MHz; when the working frequency band is n3, the corresponding uplink frequency range is 1710 MHz-1785 MHz, and the corresponding downlink frequency range is 1805 MHz-1880 MHz; when the working frequency band is n80, the corresponding frequency range is 1710 MHz-1785 MHz; and when the working frequency band is n81, the corresponding frequency range is 880 MHz-915 MHz. The 5G sub-6 frequency band may improve the spectral efficiency of traditional frequency bands, and the data-rate expansion capacity is higher and the coverage is larger in the comparable frequency range. The wireless infrastructure of sub-6 frequency band will be widely deployed with a beamforming solution that will greatly extend network coverage and building penetration. In this way, by employing the 5G sub-6G frequency band to transmit the plurality of 2D images and/or the plurality of depth maps may meet the transmission rate requirements on one hand, and the user environment is less restrictive on the other hand, such that efficient transmission of the plurality of 2D images and/or the plurality of depth maps may be realized in most scenarios.

For example, the electronic device 10 collects the plurality of 2D images and the plurality of depth maps. The resolution of each 2D image is 1280×720, and the color resolution of each pixel is 12 bits. The resolution of each depth map is 1280×720, and the grayscale resolution of each pixel is 16 bits. The frame rate of the terminal device 20 for displaying the plurality of 3D images is 60 frames (i.e., the electronic device 10 transmits one-to-one corresponding 60 2D images and 60 depth map per second). The compression ratio is 102:1. The size of the header file corresponding to the data packet including the 2D image and the depth map corresponding to the 2D image is 108 bits. Therefore, a size of the data stream transmitted by the electronic device 10 is: [(1280*720*12+1280*720*16+108)*60]/(102/1)=14.48 Mbps. At present, the 5G sub-6G wireless transmission mode has an uplink rate of at least 230 Mbps and a downlink rate of at least 1300 Mbps. It may be seen that the 5G sub-6G wireless transmission mode may fully meet the high-efficiency transmission of 720P high-definition 3D video.

For another example, the electronic device 10 collects the plurality of 2D images and the plurality of depth maps. The resolution of each 2D image is 1920×1080, and the color resolution of each pixel is 12 bits. The resolution of each depth map is 1920×1080, and the grayscale resolution of each pixel is 16 bits. The frame rate of the terminal device 20 for displaying the plurality of 3D images is 60 frames (i.e., the electronic device 10 transmits one-to-one corresponding 60 2D images and 60 depth map per second). The compression ratio is 102:1. The size of the header file corresponding to the data packet including the 2D image and the depth map corresponding to the 2D image is 108 bits. Therefore, a size of the data stream transmitted by the electronic device 10 is: [(1920*1080*12+1920*1080*16+ 108)*60]/(102/1)=32.57 Mbps. At present, the 5G sub-6G wireless transmission mode has an uplink rate of at least 230 Mbps and a downlink rate of at least 1300 Mbps. It may be seen that the 5G sub-6G wireless transmission mode may fully meet the high-efficiency transmission of 1080P high-definition 3D video.

Referring to FIG. 11 and FIG. 12, in some embodiments, the electronic device 10 transmits the plurality of 2D images and/or the plurality of depth maps to server 30 by means of millimeter waves.

At this time, as illustrated in FIG. 11, a transmission route of the plurality of 2D images and/or the plurality of depth maps may be as follows. The electronic device 10 firstly transmits the plurality of 2D images and/or the plurality of depth maps to a first base station by means of millimeter waves. The first base station transmits the plurality of 2D images and/or the plurality of depth maps to a core network by means of wired communication. The core network transmits the plurality of 2D images and/or the plurality of depth maps to a second base station by means of wired communication. The second base station transmits the plurality of 2D images and/or the plurality of depth maps to the server 30 by means of wireless communication. After the server 30 receives the plurality of 2D images and/or the plurality of depth maps, the server 3 convert them to the plurality of 3D images. The wireless communication between the second base station and the server 30 may be at least one of: WIFI, 4G and 5G.

Alternatively, as illustrated in FIG. 12, a transmission route of the plurality of 2D images and/or the plurality of depth maps may be as follows. The electronic device 10 firstly transmits the plurality of 2D images and/or the plurality of depth maps to a first base station by means of millimeter waves. The first base station transmits the plurality of 2D images and/or the plurality of depth maps to a core network by means of wired communication. The core network transmits the plurality of 2D images and/or the plurality of depth maps to the server 30 by means of wired communication. After the server 30 receives the plurality of 2D images and/or the plurality of depth maps, the server 3 convert them to the plurality of 3D images. At this time, the server 30 may be a server 30 independent of the core network, or may be a server 30 integrated in the core network. When the server 30 is integrated in the core network, the server 30 may be the rental server 30 provided by the operator.

The frequency band corresponding to the millimeter wave is 24.25 GHz to 52.6 GHz in 5G and 60 GHz of 802.11ad or 802.11ay in WIFI (Wireless Fidelity). The millimeter waves have a very large transmission bandwidth, which may greatly increase the wireless transmission rate. At present, based on Time Division Duplexing (TDD) standard 5G millimeter wave transmission mode, the peak of the uplink rate may reach 2000 Mbps, and the peak of the downlink rate may reach 2000 Mbps. Both the uplink rate and the downlink rate are measured when the uplink transmission exists only or when the downlink transmission exists only. Since the uplink data and downlink data in the time division duplex is transmitted in time-division intervals, considering the actual use, if the ratio of uplink and downlink is 50%, the uplink rate may also reach 1000 Mbps, and the downlink rate may also reach 1000 Mbps. It may be seen that the 5G millimeter wave wireless communication method may also efficiently transmit the plurality of 2D images, the plurality of depth maps and the 3D video.

Referring to FIG. 11 and FIG. 12, in some embodiments, the electronic device 10 transmits the plurality of 2D images and/or the plurality of depth maps to server 30 by means of FDD-LTE.

At this time, as illustrated in FIG. 11, a transmission route of the plurality of 2D images and/or the plurality of depth maps may be as follows. The electronic device 10 firstly transmits the plurality of 2D images and/or the plurality of depth maps to a first base station by means of FDD-LTE. The first base station transmits the plurality of 2D images and/or the plurality of depth maps to a core network by means of wired communication. The core network transmits the plurality of 2D images and/or the plurality of depth maps to a second base station by means of wired communication. The second base station transmits the plurality of 2D images and/or the plurality of depth maps to the server 30 by means of wireless communication. After the server 30 receives the plurality of 2D images and/or the plurality of depth maps, the server 3 converts them to the plurality of 3D images. The wireless communication between the second base station and the server 30 may be at least one of: WIFI, 4G and 5G.

Alternatively, as illustrated in FIG. 12, a transmission route of the plurality of 2D images and/or the plurality of depth maps may be as follows. The electronic device 10 firstly transmits the plurality of 2D images and/or the plurality of depth maps to a first base station by means of FDD-LTE. The first base station transmits the plurality of 2D images and/or the plurality of depth maps to a core network by means of wired communication. The core network transmits the plurality of 2D images and/or the plurality of depth maps to the server 30 by means of wired communication. After the server 30 receives the plurality of 2D images and/or the plurality of depth maps, the server 3 converts them to the plurality of 3D images. At this time, the server 30 may be a server 30 independent of the core network, or may be a server 30 integrated in the core network. When the server 30 is integrated in the core network, the server 30 may be the rental server 30 provided by the operator.

FDD-LTE refers to the Frequency Division Duplexing (FDD) system in the fourth-generation mobile communication network (Long Term Evolution, LTE). In this system, the uplink data and the downlink data are simultaneously transmitted in different frequency bands. Therefore, the FDD-LTE wireless transmission mode has a strong data transmission capability. The FDD-LTE wireless transmission mode is more suitable for symmetric services. When supporting symmetric services, it may make full use of the uplink and downlink spectrum. For example, when FDD-LTE is used to transmit the plurality of 2D images, the plurality of depth maps and the plurality of 3D images during the 3D video call, the uplink data and the downlink data are simultaneously transmitted in the uplink channel and the downlink channel because the ratio of the uplink channel and the downlink channel of the FDD-LTE is 1:1. Therefore, it may simultaneously upload and download the 2D images, the depth maps and the 3D images with large data size in 3D video call. At present, based on the wireless communication method of the frequency division duplex system in the fourth-generation mobile communication network, the uplink rate is about 200 Mbps, and the downlink rate is about 1200 Mbps. Referring to the above-mentioned example of 32.57 Mbps of 1080P ultra clear 3D video, and of 14.48 Mbps of 720P HD 3D video, it may be seen that the FDD-LTE may fully meet the high-efficiency transmission of 1080P high-definition 3D video.

Referring to FIG. 11 and FIG. 12, in some embodiments, the electronic device 10 transmits the plurality of 2D images and/or the plurality of depth maps to server 30 by means of TDD-LTE (Time Division Long Term Evolution).

At this time, as illustrated in FIG. 11, a transmission route of the plurality of 2D images and/or the plurality of depth maps may be as follows. The electronic device 10 firstly transmits the plurality of 2D images and/or the plurality of depth maps to a first base station by means of TDD-LTE. The first base station transmits the plurality of 2D images and/or the plurality of depth maps to a core network by means of wired communication. The core network transmits the plurality of 2D images and/or the plurality of depth maps to a second base station by means of wired communication. The second base station transmits the plurality of 2D images and/or the plurality of depth maps to the server 30 by means of wireless communication. After the server 30 receives the plurality of 2D images and/or the plurality of depth maps, the server 3 converts them to the plurality of 3D images. The wireless communication between the second base station and the server 30 may be at least one of: WIFI, 4G and 5G.

Alternatively, as illustrated in FIG. 12, a transmission route of the plurality of 2D images and/or the plurality of depth maps may be as follows. The electronic device 10 firstly transmits the plurality of 2D images and/or the plurality of depth maps to a first base station by means of TDD-LTE. The first base station transmits the plurality of 2D images and/or the plurality of depth maps to a core network by means of wired communication. The core network transmits the plurality of 2D images and/or the plurality of depth maps to the server 30 by means of wired communication. After the server 30 receives the plurality of 2D images and/or the plurality of depth maps, the server 3 converts them to the plurality of 3D images. At this time, the server 30 may be a server 30 independent of the core network, or may be a server 30 integrated in the core network. When the server 30 is integrated in the core network, the server 30 may be the rental server 30 provided by the operator.

TDD-LTE refers to Time Division Duplexing (FDD) standard in the fourth-generation mobile communication network (Long Term Evolution, LTE). In this system, the uplink data and the downlink data are transmitted on the same frequency band according to time cross allocation. The TDD-LTE wireless transmission mode has high flexibility, and the time slot ratio of uplink transmission and the time slot ratio of downlink transmission may be flexibly adjusted according to actual needs. The TDD-LTE wireless transmission mode is more suitable for asymmetric services. At present, based on the wireless communication method of time division duplex in the fourth-generation mobile communication network, the uplink rate is at least 24 Mbps, and the downlink rate is about 800 Mbps. Referring to the above-mentioned example of 14.48 Mbps of HD 3D video of 720P, the TDD-LTE wireless transmission mode may fully satisfy the efficient transmission of HD 3D video of 720P. Referring to the above-mentioned example of 32.57 Mbps of ultra-clear 3D video of 1080P, the uplink rate of the TDD-LTE wireless transmission mode may not meet the transmission rate requirement. However, due to the high flexibility of TDD-LTE, the time slot ratio of the uplink transmission and the time slot ratio of the downlink transmission may be flexibly adjusted. Therefore, in some scenarios, the TDD-LTE wireless transmission mode may also satisfy the transmission of ultra-clear 3D video of 1080P.

Referring to FIG. 11 and FIG. 12, in some embodiments, the electronic device 10 transmits the plurality of 2D images and/or the plurality of depth maps to server 30 by means of WIFI.

At this time, as illustrated in FIG. 11, a transmission route of the plurality of 2D images and/or the plurality of depth maps may be as follows. The electronic device 10 firstly transmits the plurality of 2D images and/or the plurality of depth maps to a first base station by means of WIFI. The first base station transmits the plurality of 2D images and/or the plurality of depth maps to a core network by means of wired communication. The core network transmits the plurality of 2D images and/or the plurality of depth maps to a second base station by means of wired communication. The second base station transmits the plurality of 2D images and/or the plurality of depth maps to the server 30 by means of wireless communication. After the server 30 receives the plurality of 2D images and/or the plurality of depth maps, the server 3 converts them to obtain the plurality of 3D images. The wireless communication between the second base station and the server 30 may be at least one of: WIFI, 4G and 5G.

Alternatively, as illustrated in FIG. 12, a transmission route of the plurality of 2D images and/or the plurality of depth maps may be as follows. The electronic device 10 firstly transmits the plurality of 2D images and/or the plurality of depth maps to a first base station by means of WIFI. The first base station transmits the plurality of 2D images and/or the plurality of depth maps to a core network by means of wired communication. The core network transmits the plurality of 2D images and/or the plurality of depth maps to the server 30 by means of wired communication. After the server 30 receives the plurality of 2D images and/or the plurality of depth maps, the server 3 converts them to obtain the plurality of 3D images. At this time, the server 30 may be a server 30 independent of the core network, or may be a server 30 integrated in the core network. When the server 30 is integrated in the core network, the server 30 may be the rental server 30 provided by the operator.

The first base station refers to a wireless access point in WIFI communication. The second base station is also referred to a wireless access point in WIFI communication.

The application frequency bands of WIFI include 2G frequency band and 5G frequency band. The frequency range corresponding to the 2G frequency band is 2.402 GHz to 2.482 GHz, and the frequency range corresponding to the 5G frequency band is 5.150 GHz to 5.350 GHz, 5.470 GHz to 5.725 GHz, and 5.725 GHz to 5.850 GHz. The WIFI wireless communication mode adopts the time division duplex working mode. At present, in the 2G frequency band, the peak of the uplink rate of the WIFI wireless communication mode may reach 300 Mbps, and the peak of the downlink rate may reach 300 Mbps. Both the uplink rate and the downlink rate are measured when the uplink transmission exists only or when the downlink transmission exists only. Since the uplink data and downlink data in the time division duplex is transmitted in time-division intervals, considering the actual use, if the ratio of uplink and downlink is 50%, the uplink rate may also reach 150 Mbps, and the downlink rate may also reach 150 Mbps. In the 5G frequency band, the peak of the uplink rate of the WIFI wireless communication mode may reach 1732 Mbps, and the peak of the downlink rate may reach 1732 Mbps. Both the uplink rate and the downlink rate are measured when the uplink transmission exists only or when the downlink transmission exists only. Since the uplink data and downlink data in the time division duplex is transmitted in time-division intervals, considering the actual use, if the ratio of uplink and downlink is 50%, the uplink rate may also reach 866 Mbps, and the downlink rate may also reach 866 Mbps. It may be seen that the WIFI wireless communication method may also efficiently transmit the plurality of 2D images, the plurality of depth maps and the 3D video.

Referring to FIG. 11 to FIG. 14, the present disclosure provides a communication method for the server 30. The server 30 communicates with the electronic device 10 and the terminal device 20 by means of wireless communication. The method includes acts in the following block.

031: a plurality of 2D images and/or a plurality of depth maps from the electronic device 10 are received.

033: a plurality of 3D images is generated based on the plurality of 2D images and/or the plurality of depth maps.

034: the plurality of 3D images is transmitted to the terminal device 20.

Figure 14:
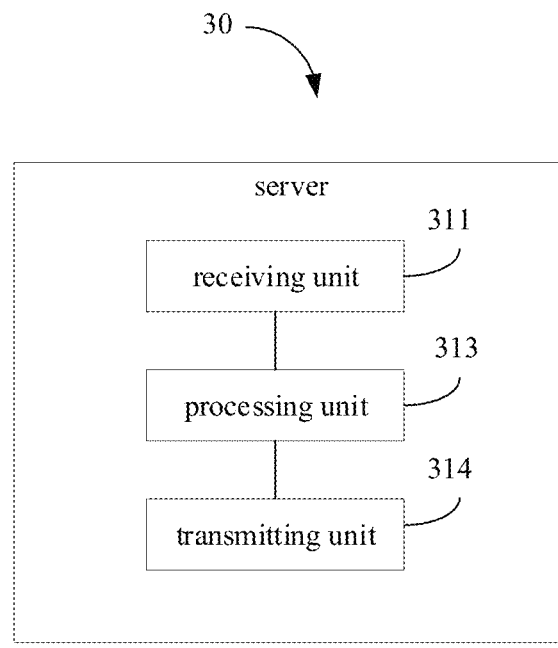
FIG. 14 illustrates a block diagram of a server according to some embodiments of the present disclosure.

Referring to FIG. 14, the present disclosure further provides a server 30. The server 30 communicates with the electronic device 10 and the terminal device 20 by means of wireless communication. The server 30 includes a receiving unit 311, a processing unit 313, and a transmitting unit 314. The act in block 031 may be implemented by the receiving unit 311. The act in block 033 may be implemented by the processing unit 313. The act in block 034 may be implemented by the transmitting unit 314. That is, the receiving unit 311 may be configured to receive a plurality of 2D images and/or a plurality of depth maps from the electronic device 10. The processing unit 313 may be configured to generate a plurality of 3D images based on the plurality of 2D images and/or the plurality of depth maps. The transmitting unit 314 may be configured to transmit the plurality of 3D images to the terminal device 20.

Figure 15:
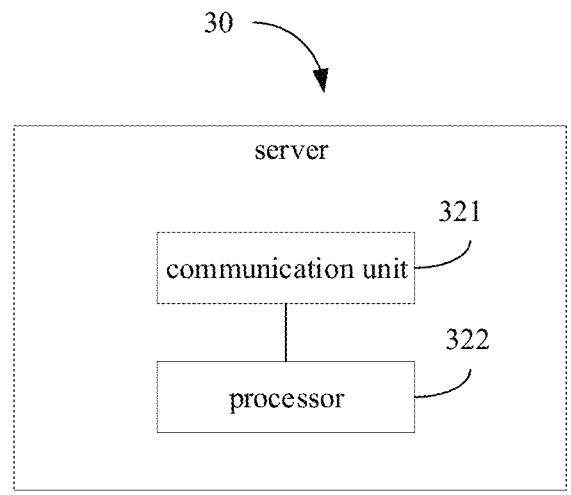
FIG. 15 illustrates a schematic diagram of a server according to some embodiments of the present disclosure.

Referring to FIG. 15, the present disclosure further provides a server 30. The server 30 communicates with the electronic device 10 and the terminal device 20 by means of wireless communication. The server 30 includes a communication unit 322 and a processor 321. The act in block 031 and the act in block 034 may be implemented by the communication unit 322. The act in block 033 may be implemented by the processor 322. That is, the communication unit 322 may be configured to receive a plurality of 2D images and/or a plurality of depth maps from the electronic device 10. The processor 322 may be configured to generate a plurality of 3D images based on the plurality of 2D images and/or the plurality of depth maps. The communication unit 322 may be further configured to transmit the plurality of 3D images to the terminal device 20.

The plurality of 3D images may form a video. In detail, the plurality of 3D images is displayed at a predetermined frame rate in the terminal device 20 to form a 3D video. The predetermined frame rate is greater than or equal to a frame rate that can be resolved by the human eye (i.e. 24 3D images per second may be displayed). The predetermined frame rate may be 24 frames (images)/second, 30 frames (images)/second, 60 frames (images)/second, 120 frames (images)/second, and the like.

The electronic device 10 may be a mobile phone, a tablet computer, a notebook computer, a smart wearable device (a smart helmet, smart glasses, a smart bracelet, a smart watch, etc.), and the like. The terminal device 20 may also be a mobile phone, a tablet computer, a notebook computer, a smart wearable device (a smart helmet, smart glasses, a smart bracelet, a smart watch, etc.), and the like, and also be the other display device, such as a virtual-reality head-mounted display device, an augmented-reality display device, a holographic stereoscopic projection device, a television equipped with a 3D liquid crystal displayer. The server 30 may be a computer or the like having a strong capability of computing and processing and a large storage capacity.

It may be understood that current video calls, video conferences, and the like are limited to the 2D video transmission. The plurality of images that make up the 2D video are 2D, which do not contain depth information, and cannot render 3D stereoscopic effects.

The communication method and the server 30, provided in the embodiments of the present disclosure, receive the plurality of 2D images and the plurality of depth maps from the electronic device 10, converts the plurality of 2D images and the plurality of depth maps to the plurality of 3D images, and transmits the plurality of 3D images to the terminal device 20 by means of wired communication and/or by means of wireless communication. In this way, on one hand, the 3D video transmission may be realized, such that a user may view stereoscopic 3D video effect at the terminal device 20, and have a better experience; on the other hand, converting the plurality of 2D images and/or the plurality of depth maps to the plurality of 3D images may be realized at the server 30. Since the server 30 has a powerful capability of computing and processing, it may shorten a period of converting the plurality of 2D images and/or the plurality of depth maps to the plurality of 3D images, without the calculation of the electronic device 10, thereby reducing an amount of data processing, and power consumption of the electronic device 10, and reducing a time period required for image processing, and shortening the delay in video communication.

Figure 16:
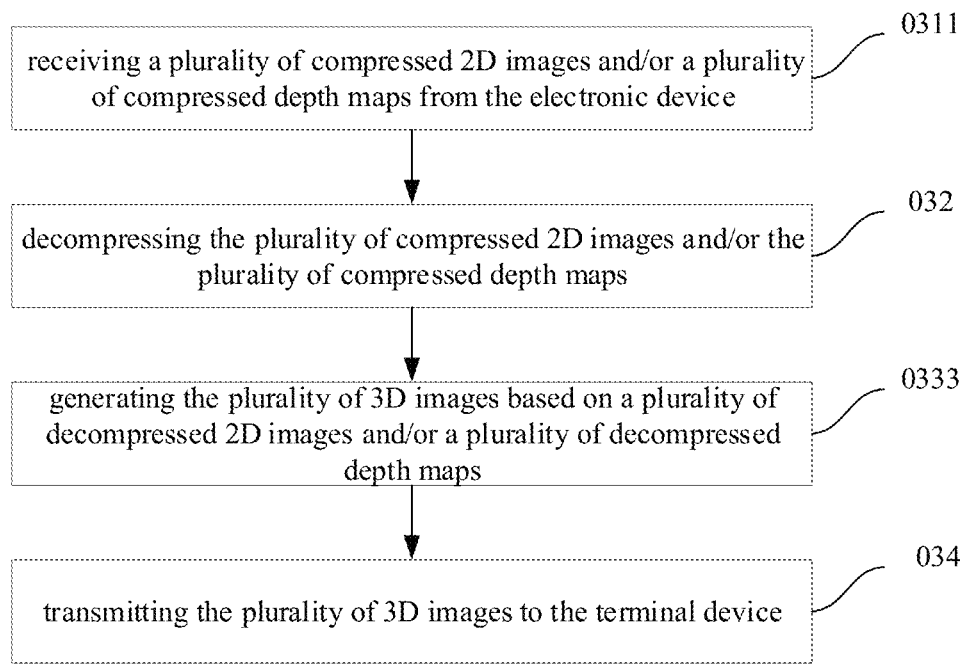
FIG. 16 illustrates a flow chart of a communication method according to some embodiments of the present disclosure.

Referring to FIG. 11, FIG. 12 and FIG. 16, in some embodiments, the act in block 031, i.e., the plurality of 2D images and/or the plurality of depth maps from the electronic device 10 are received, may include an act in the following block.

0311: a plurality of compressed 2D images and/or a plurality of compressed depth maps from the electronic device 10 are received.

The communication method provided in the embodiments of the present disclosure may further include an act in the following block.

032: the plurality of compressed 2D images and/or the plurality of compressed depth maps are decompressed.

The act in block 033, i.e., the plurality of 3D images is generated based on the plurality of 2D images and/or the plurality of depth maps, may include an act in the following block.

0333: the plurality of 3D images is generated based on a plurality of decompressed 2D images and/or a plurality of decompressed depth maps.

Figure 17:
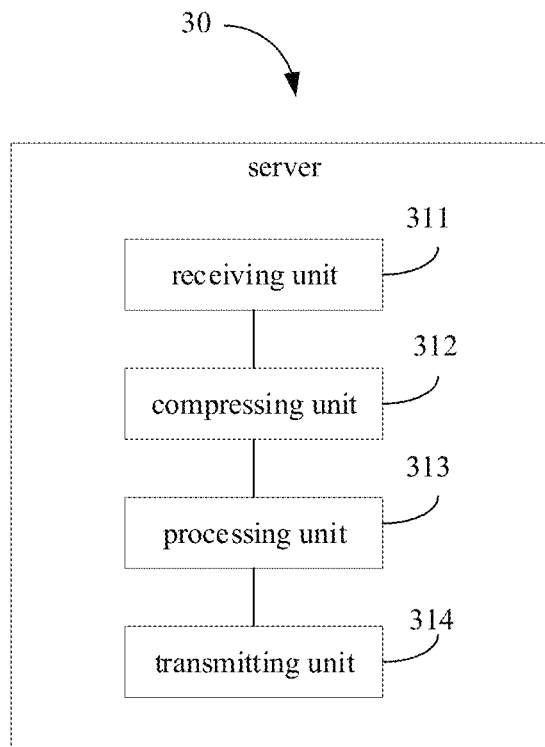
FIG. 17 illustrates a block diagram of a server according to some embodiments of the present disclosure.

Referring to FIG. 17, in some embodiments, the server 30 also includes a compressing unit 312. The act in block 0311 may be implemented by the receiving unit 311. The act in block 032 may be implemented by the compressing unit 312. The act in block 0333 may be implemented by the processing unit 313. That is, the receiving unit 311 may be further configured to receive the plurality of compressed 2D images and/or the plurality of compressed depth maps from the electronic device 10. The compressing unit 312 may be configured to decompress the plurality of compressed 2D images and/or the plurality of compressed depth maps. The processing unit 313 may be configured to generate the plurality of 3D images based on the plurality of decompressed 2D images and/or the plurality of decompressed depth maps.

Referring to FIG. 15, in some embodiments, the act in block 0311 may be implemented by the communication unit 321. The act in block 032 and the act in block 0333 may be implemented by the processor 322. That is, the communication unit 321 may be configured to receive the plurality of compressed 2D images and/or the plurality of compressed depth maps from the electronic device 10. The processor 322 is further configured to decompress the plurality of compressed 2D images and/or the plurality of compressed depth maps, and to generate the plurality of 3D images based on the plurality of decompressed 2D images and/or the plurality of decompressed depth maps.

In detail, a size of data packets including the plurality of 2D images and/or the plurality of depth maps is large. Due to the development of wireless communication technologies, the electronic device 10 needs to compress the plurality of 2D images and/or the plurality of depth maps before performing data transmission. After the server 30 receives the plurality of compressed 2D images and/or the plurality of compressed depth maps, the server 30 needs to decompress the compressed data, and convert the plurality of decompressed 2D images and/or the plurality of decompressed depth maps to the plurality of 3D images.

Referring to FIG. 11 and FIG. 12, in some embodiments, the server 30 receives the plurality of 2D images and/or the plurality of depth maps from the electronic device 10 by means of at least one wireless communication of: WIFI, 4G and 5G That is, the communication mode between the server 30 and the electronic device 10 may include only one of WIFI, 4G or 5G and may also include WIFI and 4G WIFI and 5G 4G and 5G or also includes WIFI, 4G and 5G. The server 30 transmits the plurality of 3D images to the terminal device 20 by means of at least one wireless communication of WIFI, 4G and 5G and/or by means of wired communication. That is, the communication mode between the server 30 and the electronic device 10 may include only one of WIFI, 4G, 5G and wired communication, and may also include any two or three of WIFI, 4G, 5G and wired communication, and may also include WIFI, 4G, 5G and wired communication. When the server 30 and the terminal device 20 communicate by means of wired communication, the terminal device 20 may be a device that may communicate by means of wired connection, such as a notebook computer, a virtual-reality head-mounted display device, an augmented-reality display device, a holographic stereoscopic projection device.

In detail, the electronic device 10 may transmits the plurality of 2D images and/or the plurality of depth maps to the server 30 by means of the sub-6G frequency band of 5G. The server 30 transmits the plurality of 3D images to the terminal device 20 by means of wired communication, and/or by means of wireless communication.

At this time, as illustrated in FIG. 11, a transmission route of the plurality of 2D images and/or the plurality of depth maps may be as follows. The electronic device 10 firstly transmits the plurality of 2D images and/or the plurality of depth maps to a first base station by means of the sub-6G frequency band of 5G The first base station transmits the plurality of 2D images and/or the plurality of depth maps to a core network by means of wired communication. The core network transmits the plurality of 2D images and/or the plurality of depth maps to a second base station by means of wired communication. The second base station transmits the plurality of 2D images and/or the plurality of depth maps to the server 30 by means of wireless communication (at least one of WIFI, 4G and 5G). After the server 30 receives the plurality of 2D images and/or the plurality of depth maps, the server 3 converts them to the plurality of 3D images. Subsequently, the server 30 transmits the plurality of 3D images to the terminal device 20 by means of wired communication and/or by means of wireless communication.

Alternatively, as illustrated in FIG. 12, a transmission route of the plurality of 2D images and/or the plurality of depth maps may be as follows. The electronic device 10 firstly transmits the plurality of 2D images and/or the plurality of depth maps to a first base station by means of the sub-6G frequency band of 5G The first base station transmits the plurality of 2D images and/or the plurality of depth maps to a core network by means of wired communication. The core network transmits the plurality of 2D images and/or the plurality of depth maps to the server 30 by means of wired communication. After the server 30 receives the plurality of 2D images and/or the plurality of depth maps, the server 3 convert them to the plurality of 3D images. At this time, the server 30 may be a server 30 independent of the core network, or may be a server 30 integrated in the core network. A transmission route of the plurality of 3D images may be as follows. The server 30 may transmit the plurality of 3D images to the core network by means of wired communication. The core network may transmit the plurality of 3D images to the second base station by means of wired communication. The second base station may transmit the plurality of 3D images to the terminal device 20 by means of wireless communication (at least one of WIFI, 4G and 5G).

The 5G sub-6 frequency band may improve the spectral efficiency of traditional frequency bands, and the data-rate expansion capacity is higher and the coverage is larger in the comparable frequency range. The wireless infrastructure of sub-6 frequency band will be widely deployed with a beamforming solution that will greatly extend network coverage and building penetration. In this way, by employing the 5G sub-6G frequency band to transmit the plurality of 2D images and/or the plurality of depth maps may meet the transmission rate requirements on one hand, and the user environment is less restrictive on the other hand, such that efficient transmission of the plurality of 2D images and/or the plurality of depth maps may be realized in most scenarios.

Alternatively, the electronic device 10 may transmit the plurality of 2D images and/or the plurality of depth maps to the server 30 by means of millimeter wave, and the server 30 transmits the plurality of 3D images to the terminal device 20 by mean of wired communication and/or by means of wireless communication.

At this time, as illustrated in FIG. 11, a transmission route of the plurality of 2D images and/or the plurality of depth maps may be as follows. The electronic device 10 firstly transmits the plurality of 2D images and/or the plurality of depth maps to a first base station by means of millimeter waves. The first base station transmits the plurality of 2D images and/or the plurality of depth maps to a core network by means of wired communication. The core network transmits the plurality of 2D images and/or the plurality of depth maps to a second base station by mean of wired communication. The second base station transmits the plurality of 2D images and/or the plurality of depth maps to the server 30 by mean of wireless communication (at least one of WIFI, 4G and 5G). After the server 30 receives the plurality of 2D images and/or the plurality of depth maps, the server 3 convert them to the plurality of 3D images. Subsequently, the server 30 transmits the plurality of 3D images to the terminal device 20 by means of wired communication and/or by means of wireless communication.

Alternatively, as illustrated in FIG. 12, a transmission route of the plurality of 2D images and/or the plurality of depth maps may be as follows. The electronic device 10 firstly transmits the plurality of 2D images and/or the plurality of depth maps to a first base station by means of millimeter waves. The first base station transmits the plurality of 2D images and/or the plurality of depth maps to a core network by means of wired communication. The core network transmits the plurality of 2D images and/or the plurality of depth maps to the server 30 by means of wired communication. After the server 30 receives the plurality of 2D images and/or the plurality of depth maps, the server 3 convert them to the plurality of 3D images. At this time, the server 30 may be a server 30 independent of the core network, or may be a server 30 integrated in the core network. A transmission route of the plurality of 3D images may be as follows. The server 30 may transmit the plurality of 3D images to the core network by means of wired communication. The core network may transmit the plurality of 3D images to the second base station by means of wired communication. The second base station may transmit the plurality of 3D images to the terminal device 20 by means of wireless communication manner (at least one of WIFI, 4G and 5G).

The millimeter waves have a very large transmission bandwidth, which may greatly increase the wireless transmission rate, and efficiently transmit the plurality of 2D images, the plurality of depth maps and the 3D video.

Alternatively, the electronic device 10 may transmit the plurality of 2D images and/or the plurality of depth maps to the server 30 by means of FDD-LTE, and the server 30 transmits the plurality of 3D images to the terminal device 20 by means of FDD-LTE.

At this time, as illustrated in FIG. 11, a transmission route of the plurality of 2D images and/or the plurality of depth maps may be as follows. The electronic device 10 firstly transmits the plurality of 2D images and/or the plurality of depth maps to a first base station by means of FDD-LTE. The first base station transmits the plurality of 2D images and/or the plurality of depth maps to a core network by means of wired communication. The core network transmits the plurality of 2D images and/or the plurality of depth maps to a second base station by means of wired communication. The second base station transmits the plurality of 2D images and/or the plurality of depth maps to the server 30 by means of wireless communication (at least one of WIFI, 4G and 5G). After the server 30 receives the plurality of 2D images and/or the plurality of depth maps, the server 3 converts them to the plurality of 3D images. Subsequently, the server 30 transmits the plurality of 3D images to the terminal device 20 by means of wired communication and/or by means of wireless communication.

Alternatively, as illustrated in FIG. 12, a transmission route of the plurality of 2D images and/or the plurality of depth maps may be as follows. The electronic device 10 firstly transmits the plurality of 2D images and/or the plurality of depth maps to a first base station by means of FDD-LTE. The first base station transmits the plurality of 2D images and/or the plurality of depth maps to a core network by means of wired communication. The core network transmits the plurality of 2D images and/or the plurality of depth maps to the server 30 by means of wired communication. After the server 30 receives the plurality of 2D images and/or the plurality of depth maps, the server 3 converts them to the plurality of 3D images. At this time, the server 30 may be a server 30 independent of the core network, or may be a server 30 integrated in the core network. A transmission route of the plurality of 3D images may be as follows. The server 30 may transmit the plurality of 3D images to the core network by means of wired communication. The core network may transmit the plurality of 3D images to the second base station by means of wired communication. The second base station may transmit the plurality of 3D images to the terminal device 20 by means of wireless communication (at least one of WIFI, 4G and 5G).

In FDD-LTE system, the uplink data and the downlink data are simultaneously transmitted in different frequency bands. Therefore, the FDD-LTE wireless transmission mode has a strong data transmission capability. The FDD-LTE wireless transmission mode is more suitable for symmetric services. When supporting symmetric services, it may make full use of the uplink and downlink spectrum. For example, when FDD-LTE is used to transmit the plurality of 2D images, the plurality of depth maps and the plurality of 3D images during the 3D video call, the uplink data and the downlink data are simultaneously transmitted in the uplink channel and the downlink channel because the ratio of the uplink channel and the downlink channel of the FDD-LTE is 1:1. Therefore, it may simultaneously upload and download the 2D images, the depth maps and the 3D images with large data size in 3D video call, and satisfy the efficient transmission of the plurality of 2D images, the plurality of depth maps, and the plurality of 3D images.

Alternatively, the electronic device 10 may transmit the plurality of 2D images and/or the plurality of depth maps to the server 30 by means of TDD-LTE (Time Division Long Term Evolution), and the server 30 transmits the plurality of 3D images to the terminal device 20 by means of wired communication and/or by means of wireless communication.

At this time, as illustrated in FIG. 11, a transmission route of the plurality of 2D images and/or the plurality of depth maps may be as follows. The electronic device 10 firstly transmits the plurality of 2D images and/or the plurality of depth maps to a first base station by means of TDD-LTE. The first base station transmits the plurality of 2D images and/or the plurality of depth maps to a core network by means of wired communication. The core network transmits the plurality of 2D images and/or the plurality of depth maps to a second base station by means of wired communication. The second base station transmits the plurality of 2D images and/or the plurality of depth maps to the server 30 by means of wireless communication (at least one of WIFI, 4G and 5G). After the server 30 receives the plurality of 2D images and/or the plurality of depth maps, the server 3 converts them to the plurality of 3D images. Subsequently, the server 30 transmits the plurality of 3D images to the terminal device 20 by means of wired communication and/or by means of wireless communication.

Alternatively, as illustrated in FIG. 12, a transmission route of the plurality of 2D images and/or the plurality of depth maps may be as follows. The electronic device 10 firstly transmits the plurality of 2D images and/or the plurality of depth maps to a first base station by means of TDD-LTE. The first base station transmits the plurality of 2D images and/or the plurality of depth maps to a core network by means of wired communication. The core network transmits the plurality of 2D images and/or the plurality of depth maps to the server 30 by means of wired communication. After the server 30 receives the plurality of 2D images and/or the plurality of depth maps, the server 3 converts them to the plurality of 3D images. At this time, the server 30 may be a server 30 independent of the core network, or may be a server 30 integrated in the core network. A transmission route of the plurality of 3D images may be as follows. The server 30 may transmit the plurality of 3D images to the core network by means of wired communication. The core network may transmit the plurality of 3D images to the second base station by means of wired communication. The second base station may transmit the plurality of 3D images to the terminal device 20 by means of wireless communication (at least one of WIFI, 4G and 5G).

In the TDD-LTE system, the transmission of uplink data and downlink data is performed on the same frequency band according to time cross allocation. The wireless transmission mode of TDD-LTE has high flexibility, and the time slot ratio of uplink transmission and the time slot ratio of downlink transmission may be flexibly adjusted according to actual needs, thereby satisfying efficient transmission of the plurality of 2D images, the plurality of depth maps, and the plurality of 3D images.

Alternatively, the electronic device 10 may transmit the plurality of 2D images and/or the plurality of depth maps to the server 30 by means of WIFI, and the server 30 transmits the plurality of 3D images to the terminal device 20 by means of wired communication and/or by means of wireless communication.

At this time, as illustrated in FIG. 11, a transmission route of the plurality of 2D images and/or the plurality of depth maps may be as follows. The electronic device 10 firstly transmits the plurality of 2D images and/or the plurality of depth maps to a first base station by means of WIFI. The first base station transmits the plurality of 2D images and/or the plurality of depth maps to a core network by means of wired communication. The core network transmits the plurality of 2D images and/or the plurality of depth maps to a second base station by means of wired communication. The second base station transmits the plurality of 2D images and/or the plurality of depth maps to the server 30 by means of wireless communication (at least one of WIFI, 4G and 5G). After the server 30 receives the plurality of 2D images and/or the plurality of depth maps, the server 3 converts them to obtain the plurality of 3D images. Subsequently, the server 30 transmits the plurality of 3D images to the terminal device 20 by means of wired communication and/or by means of wireless communication.

Alternatively, as illustrated in FIG. 12, a transmission route of the plurality of 2D images and/or the plurality of depth maps may be as follows. The electronic device 10 firstly transmits the plurality of 2D images and/or the plurality of depth maps to a first base station by means of WIFI. The first base station transmits the plurality of 2D images and/or the plurality of depth maps to a core network by means of wired communication. The core network transmits the plurality of 2D images and/or the plurality of depth maps to the server 30 by means of wired communication. After the server 30 receives the plurality of 2D images and/or the plurality of depth maps, the server 3 converts them to obtain the plurality of 3D images. At this time, the server 30 may be a server 30 independent of the core network, or may be a server 30 integrated in the core network. A transmission route of the plurality of 3D images may be as follows. The server 30 may transmit the plurality of 3D images to the core network by means of wired communication. The core network may transmit the plurality of 3D images to the second base station by means of wired communication. The second base station may transmit the plurality of 3D images to the terminal device 20 by means of wireless communication (at least one of WIFI, 4G and 5G).

The uplink rate and the downlink rate of the WIFI wireless communication method are both high, which may satisfy the efficient transmission of the plurality of 2D images, the plurality of depth maps, and the plurality of 3D images.

Figure 18:
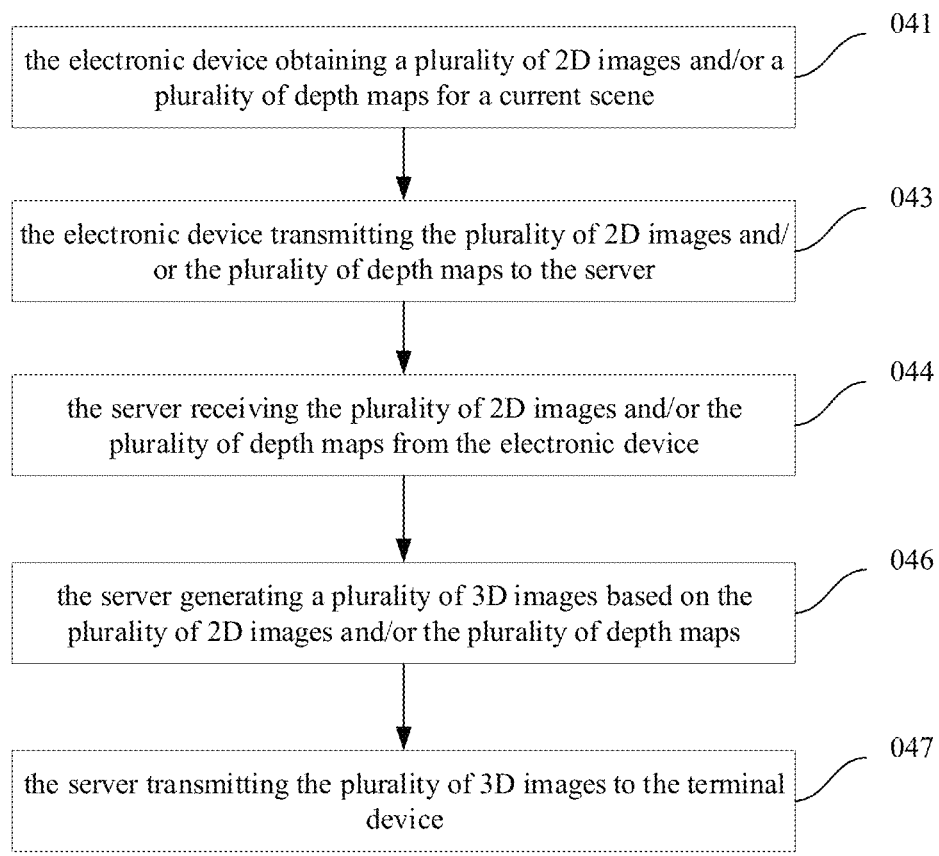
FIG. 18 to FIG. 21 illustrate flow charts of a communication method according to some embodiments of the present disclosure.

Referring to FIG. 11, FIG. 12 and FIG. 18, the present disclosure provides a communication method for a communication system 100. The system 100 includes an electronic device 10, a server 30, and a terminal device 20. The method includes acts in the following blocks.

041: the electronic device 10 obtains a plurality of 2D images and/or a plurality of depth maps for a current scene.

043: the electronic device 10 transmits the plurality of 2D images and/or the plurality of depth maps to the server 30.

044: the server 30 receives the plurality of 2D images and/or the plurality of depth maps from the electronic device 20.

046: the server 30 generates a plurality of 3D images based on the plurality of 2D images and/or the plurality of depth maps.

047: the server 30 transmits the plurality of 3D images to the terminal device 20.

Referring to FIG. 2, FIG. 11, FIG. 12 and FIG. 14, the present disclosure further provides a communication system 100. The system 100 includes an electronic device 10, a server 30, and a terminal device 20. The electronic device 10 may be the electronic device 10 of any of the foregoing embodiments, the server 30 may be the server 30 of any of the foregoing embodiments, the terminal device 20 may be the terminal device 20 of any of the foregoing embodiments, and details are not described herein.

Referring to FIG. 2 and FIG. 14, in some embodiments, the act in block 041 may be implemented by the obtaining module 111. The act in block 043 may be implemented by the transmitting module 113. The act in block 044 may be implemented by the receiving unit 311. The act in block 046 may be implemented by the processing unit 313. The act in block 047 may be implemented by the transmitting unit 314.

Referring to FIGS. 3 and 15, in some embodiments, the act in block 041 may be implemented by the image acquisition component 121. The act in block 043 may be implemented by the communication module 123. The act in block 044 and the act in block 047 may be implemented by the communication unit 321. The act in block 046 may be implemented by the processor 322.

Figure 19:
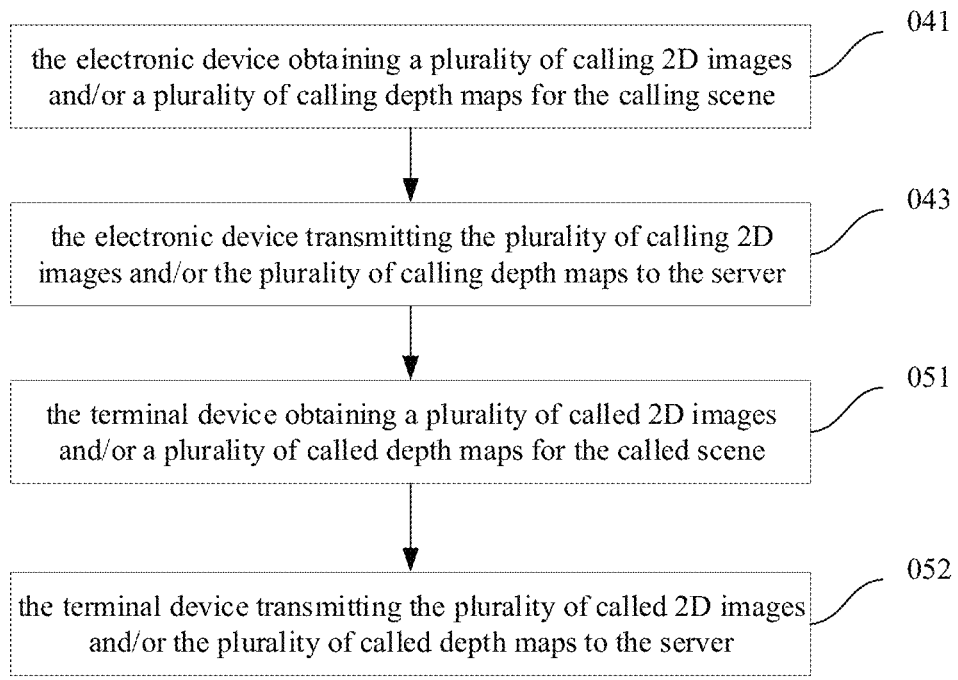

Referring to FIG. 5 and FIG. 19, in some embodiments, the communication method provided in the embodiments of the present disclosure may be applied to a 3D video call and a 3D video conference, which may realize the interaction among the users. It is assumed that the electronic device 10 is a calling device, and the terminal device 20 is a called device. In this case, the act in block 041 may be follows: the electronic device 10 obtains a plurality of calling 2D images and/or a plurality of calling depth maps for the calling scene; the act in block 043 may be follows: the electronic device 10 transmits the plurality of calling 2D images and/or the plurality of calling depth maps to the server 30. Further, the communication method provided the embodiments of the present disclosure further includes acts in the following blocks.

051: the terminal device 20 obtains a plurality of called 2D images and/or a plurality of called depth maps, for the called scene.

052: the terminal device 20 transmits the plurality of called 2D images and/or the plurality of called depth maps to the server 30.

Referring to FIG. 5, in some embodiments, the act in block 051 may be implemented by the obtaining sub-module 211. The act in block 052 may be implemented by the transmitting sub-module 212.

Referring to FIG. 6, in some embodiments, the act in block 051 may be implemented by the image acquisition component 221. The act in block 052 may be implemented by the communication component 223.

Figure 20:
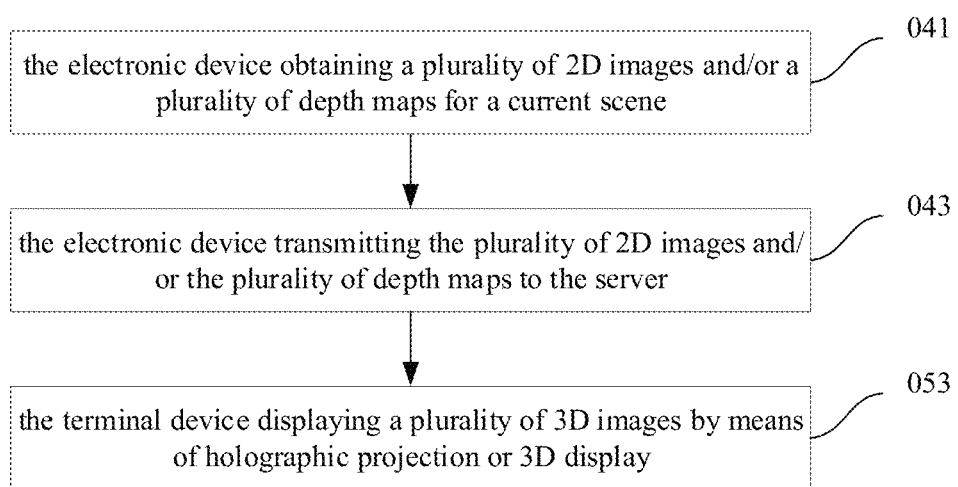

Referring to FIG. 5 and FIG. 20, in some embodiments, the communication method provided in the embodiments of the present disclosure may also be applied to a virtual-reality head-mounted display device, an augmented-reality display device, a holographic stereoscopic projection device, a display device equipped with a 3D liquid crystal displayer, or the like. At this time, the communication method provided in the embodiments of the present disclosure further includes acts in the following blocks.

053: the terminal device 20 displays a plurality of 3D images by means of holographic projection or 3D display.

Referring to FIG. 5, in some embodiments, the act in block 053 may be implemented by the display sub-module 213.

Referring to FIG. 6, in some embodiments, the terminal device 20 further includes a processor 222. The act in block 053 may be implemented by the processor 222 of the terminal device 20.

Figure 21:
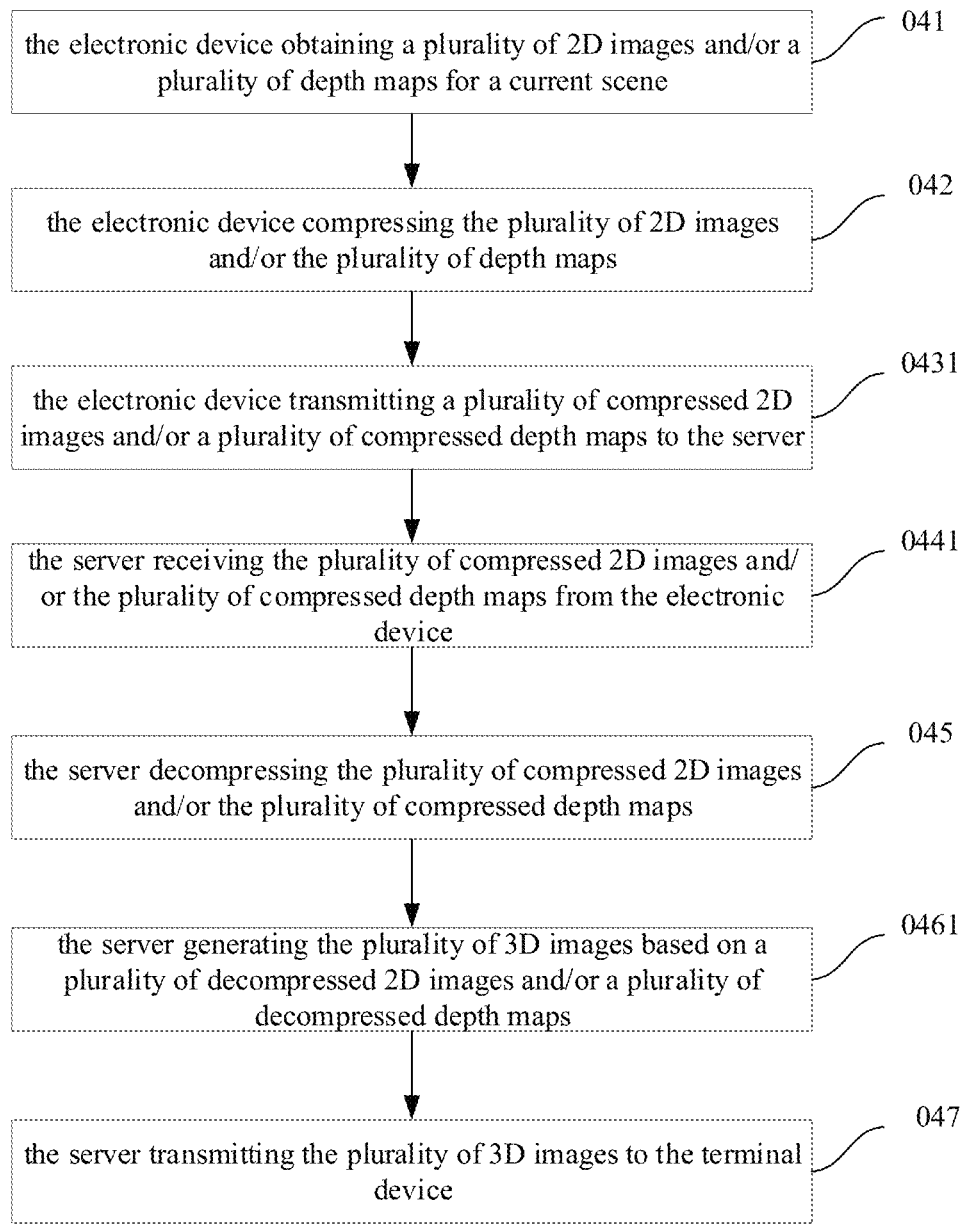

Referring to FIG. 2 and FIG. 21, in some embodiments, the communication method provided in the embodiments of the present disclosure further includes acts in the following blocks.

042: the electronic device 10 compresses the plurality of 2D images and/or the plurality of depth maps.

The act in block 043, i.e., the electronic device 10 transmits the plurality of 2D images and/or the plurality of depth maps to the server 30, may include an act in the following blocks.

0431: the electronic device 10 transmits a plurality of compressed 2D images and/or a plurality of compressed depth maps to the server 30.

Referring to FIG. 2, in some embodiments, the act in block 042 may be implemented by the compressing module 112. The act in block 0431 may be implemented by the transmitting module 113.

Referring to FIG. 3, in some embodiments, the act in block 042 may be implemented by the processor 122 of the electronic device 10. The act in block 0431 may be implemented by the transmitting module 123.

Referring to FIG. 11, FIG. 12 and FIG. 21, in some embodiments, the act in block 044, i.e., the server 30 receives the plurality of 2D images and/or the plurality of depth maps transmitted by the electronic device 10, includes acts in the following block.

0441: the server 30 receives the plurality of compressed 2D images and/or the plurality of compressed depth maps from the electronic device 10.

The communication method provided in the embodiments of the present disclosure may include an act in the following block.

045: the server 30 decompresses the plurality of compressed 2D images and/or the plurality of compressed depth maps.

The act in block 046, i.e., the server 30 generates the plurality of 3D images based on the plurality of 2D images and/or the plurality of depth maps, may include an act in the following block.

0461: the server 30 generates the plurality of 3D images based on a plurality of decompressed 2D images and/or a plurality of decompressed depth maps.

Referring to FIG. 17, in some embodiments, the s act in block 0441 may be implemented by the receiving unit 311. The act in block 045 may be implemented by the compressing unit 312. The act in block 0461 may be implemented by the processing unit 313.

Referring to FIG. 15, in some embodiments, the act in block 0441 may be implemented by the communication unit 321. The act in block 045 and the act in block 0461 may be implemented by the processor 322.

Referring to FIG. 11 and FIG. 12, in some embodiments, the server 30 receives the plurality of 2D images and/or the plurality of depth maps transmitted by the electronic device 10 by means of at least one wireless communication of WIFI, 4G and 5G. The server 30 transmits the plurality of 3D images to the terminal device 20 by means of at least one wireless communication of WIFI, 4G and 5G.

With the communication method and the communication system 100 provided in the embodiments of the present disclosure, on one hand, the 3D video transmission may be realized, such that a user may view stereoscopic 3D video effect at the terminal device 20, and have a better experience; on the other hand, converting the plurality of 2D images and/or the plurality of depth maps to the plurality of 3D images may be realized at the server 30, without the calculation at the electronic device 10, thereby reducing an amount of data processing, and power consumption of the electronic device 10, and reducing a time period required for image processing, and shortening the delay in video communication.

Referring to FIG. 3, FIG. 6, FIG. 11 and FIG. 12, the present disclosure further provides the non-transitory computer-readable storage medium including one or more computer executable instructions. When the one or more computer executable instructions are executed by one or more processors 122/222/322, the one or more processors 122/222/322, performs the communication method described in any of the above embodiments For example, when the one or more computer executable instructions are executed by the one or more processors 122, the one or more processors 122 may performs the following acts:

controlling the image acquisition component 121 to obtain a plurality of 2D images and/or a plurality of depth maps, for a current scene; and controlling the communication module 123 to transmit the plurality of 2D images and/or the plurality of depth maps to the server 30, such that the server 30 is configured to generate a plurality of 3D images based on the plurality of 2D images and/or the plurality of depth maps, and to transmit the plurality of 3D images to a terminal device 20

For another example, when the one or more computer executable instructions are executed by the one or more processors 222, the one or more processors 222 may performs the following acts:

controlling image acquisition component 221 to obtain a plurality of called 2D images and/or a plurality of called depth maps, for a called scene; and controlling the communication component 223 to transmit the plurality of called 2D images and/or the plurality of depth maps to the server 30.

For another example, when the one or more computer executable instructions are executed by the one or more processors 322, the one or more processors 322 may performs the following acts:

controlling the communication unit 322 to receive a plurality of 2D images and/or a plurality of depth maps from the electronic device 10;

controlling the processor 322 of the server 10 to generate a plurality of 3D images based on the plurality of 2D images and/or the plurality of depth maps; and controlling the communication unit 322 to transmit the plurality of 3D images to the terminal device 20.

For another example, when the one or more computer executable instructions are executed by the one or more processors 122/222/322, the one or more processors 122/222/322 may performs the following acts:

controlling the image acquisition component 121 to obtain a plurality of 2D images and/or a plurality of depth maps, for a current scene;

controlling the communication module 123 to transmit the plurality of 2D images and/or the plurality of depth maps to the server 30;

controlling the communication unit 322 to receive the plurality of 2D images and/or the plurality of depth maps from the electronic device 10;

controlling the processor 322 of the server 10 to generate a plurality of 3D images based on the plurality of 2D images and/or the plurality of depth maps; and controlling the communication unit 322 of the server 10 to transmit the plurality of 3D images to the terminal device 20.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be converted in any suitable manner in one or more embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer-readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer-readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer-readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A communication method, comprising:
obtaining, by an electronic device, a plurality of two-dimensional (2D) images and/or a plurality of depth maps for a current scene, the plurality of 2D images and/or the plurality of depth maps being aligned in time; compressing the plurality of 2D images and/or the plurality of depth maps in a compression ratio, wherein the compression ratio can be adaptively adjusted according to different scenarios, the scenarios including one or more of the following: an application of the plurality of 2D images and an application of the plurality of depth maps, wherein the application comprises: a video call, and a holographic projection; and transmitting, by the electronic device, the plurality of compressed 2D images and/or the plurality of compressed depth maps to a server by means of wireless communication.

2. The method of claim 1, further comprising:

capturing the plurality of depth maps by a structured light projection component provided in the electronic device; and/or capturing a plurality of first 2D images by a first camera provided in the electronic device, and capturing a plurality of second 2D images by a second camera provided in the electronic device, the plurality of first 2D images and the plurality of second 2D images having one-to-one corresponding, the plurality of 2D images comprises the plurality of first 2D images and the plurality of second 2D images; and/or capturing the plurality of depth maps by a TOF (Time of Flight) sensor module provided in the electronic device.

3. The method of claim 1, wherein the wireless communication comprises at least one of: WIFI (Wireless Fidelity), 4G and 5G.

4. The method of claim 3, wherein the transmitting, by the electronic device, the plurality of 2D images and/or the plurality of depth maps to the server by means of wireless communication, comprises:

transmitting, by the electronic device, the plurality of 2D images and/or the plurality of depth maps to a first base station by means of wireless communication;

transmitting, by the first base station, the plurality of 2D images and/or the plurality of depth maps to a core network by means of wired communication;

transmitting, by the core network, the plurality of 2D images and/or the plurality of depth maps to a second base station by means of wired communication; and transmitting, by the second base station, the plurality of 2D images and/or the plurality of depth maps to the server by means of wireless communication.

5. The method of claim 3, wherein the transmitting, by the electronic device, the plurality of 2D images and/or the plurality of depth maps to the server by means of wireless communication, comprises:

transmitting, by the electronic device, the plurality of 2D images and/or the plurality of depth maps to a first base station by means of wireless communication;

transmitting, by the first base station, the plurality of 2D images and/or the plurality of depth maps to a core network by means of wired communication; and transmitting, by the core network, the plurality of 2D images and/or the plurality of depth maps to the server by means of wired communication.

6. The method of claim 1, further comprising:

receiving a plurality of 3D images from the server.

7. The method of claim 6, further comprising:

displaying the plurality of 3D images at a predetermined frame rate to display a corresponding 3D video.

8. The method of claim 6, further comprising:

displaying the plurality of 3D images by means of holographic projection or 3D display.

9. The method of claim 6, wherein the plurality of 3D images is obtained by the server by converting the plurality of 2D images and/or the plurality of depth maps; or the plurality of 3D images is obtained by the server by converting a plurality of 2D images and/or a plurality of depth maps from a terminal device.

10. An electronic device, comprising:

an image acquisition component, configured to obtain a plurality of two-dimensional (2D) images and/or a plurality of depth maps for a current scene, the plurality of 2D images and/or the plurality of depth maps being aligned in time;

a processor, configured to compress the plurality of 2D images and/or the plurality of depth maps in a compression ratio, wherein the compression ratio can be adaptively adjusted according to different scenarios, the scenarios including one or more of the following: an application of the plurality of 2D images and an application of the plurality of depth maps, wherein the application comprises: a video call, and a holographic projection; and a communication module, configured to transmit the plurality of compressed 2D images and/or the plurality of compressed depth maps to a server by means of wireless communication.

11. The electronic device of claim 10, wherein, the image acquisition component comprises a structured light projection module configured to obtain the plurality of depth maps; and/or the image acquisition component comprises a first camera and a second camera, the first camera is configured to obtain a plurality of first 2D images, the second camera is configured to obtain a plurality of second 2D images, the plurality of 2D images comprise the plurality of first 2D images and the plurality of first 2D images; and/or the image acquisition component comprises a TOF (Time of Flight) sensor module configured to obtain the plurality of depth maps.

12. The electronic device of claim 10, wherein the wireless communication comprises at least one of: WIFI (Wireless Fidelity), 4G and 5G.

13. The electronic device of claim 12, wherein the communication module is configured to transmit the plurality of 2D images and/or the plurality of depth maps to a first base station by means of wireless communication, wherein the first base station is configured to transmit the plurality of 2D images and/or the plurality of depth maps to a core network by means of wired communication;

the core network is configured to transmit the plurality of 2D images and/or the plurality of depth maps to a second base station by means of wired communication; and the second base station is configured to transmit the plurality of 2D images and/or the plurality of depth maps to the server by means of wireless communication.

14. The electronic device of claim 12, wherein the communication module is configured to transmit the plurality of 2D images and/or the plurality of depth maps to a first base station by means of wireless communication;

wherein the first base station is configured to transmit the plurality of 2D images and/or the plurality of depth maps to a core network by means of wired communication; and the core network is configured to transmit the plurality of 2D images and/or the plurality of depth maps to the server by means of wired communication.

15. The electronic device of claim 10, further comprising:

a receiving component, configured to receive a plurality of 3D images from the server.

16. The electronic device of claim 15, further comprising:
a displaying component, configured to display the plurality of 3D images at a predetermined frame rate to display a corresponding 3D video.

17. The electronic device of claim 15, further comprising:
a displaying component, configured to display the plurality of 3D images by means of holographic projection or 3D display.

18. A server, comprising:
a receiving component, configured to receive, from an electronic device, a plurality of compressed two-dimensional (2D) images and/or a plurality of compressed depth maps, wherein the plurality of compressed 2D images and/or the plurality of compressed depth maps are obtained by compressing a plurality of 2D images and/or a plurality of depth maps in a compression ratio, the plurality of 2D images and/or the plurality of depth maps being aligned in time, the compression ratio being able to be adaptively adjusted according to different scenarios, the scenarios including one or more of the following: an application of the plurality of 2D images and an application of the plurality of depth maps, wherein the application comprises: a video call, and a holographic projection;
a processor, configured to decompress the plurality of compressed 2D images and/or the plurality of compressed depth maps and to generate a plurality of 3D images based on a plurality of decompressed 2D images and/or a plurality of decompressed depth maps; and
a communication component, configured to transmit the plurality of 3D images to a terminal device.

19. The server of claim 18, wherein the communication component is configured to:
transmit the plurality of 3D images to the terminal device by means of wireless communication and/or by means of wired communication.

20. The server of claim 18, wherein the communication component is configured to transmit the plurality of 3D images to the terminal device by:
transmitting, by a server, the plurality of 3D images to a core network by means of wired communication;
transmitting, by the core network, the plurality of 3D images to a second base station by means of wired communication; and
transmitting, by the second base station, the plurality of 3D images to the terminal device by means of wireless communication.

\* \* \* \* \*